United States Patent
Shuman et al.

(10) Patent No.: US 12,255,696 B2
(45) Date of Patent: Mar. 18, 2025

(54) DETECTION OF RADIO FREQUENCY SIGNAL TRANSFER ANOMALIES

(71) Applicant: QUALCOMM Incorporated, San Diego, CA (US)

(72) Inventors: Mohammed Ataur Rahman Shuman, San Diego, CA (US); Jonathan Petit, Wenham, MA (US); Dan Vassilovski, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/483,965

(22) Filed: Sep. 24, 2021

(65) Prior Publication Data

US 2023/0100298 A1 Mar. 30, 2023

(51) Int. Cl.
*H04B 17/345* (2015.01)
*H04B 17/354* (2015.01)
*H04W 4/44* (2018.01)
*H04W 76/15* (2018.01)

(52) U.S. Cl.
CPC ......... *H04B 17/345* (2015.01); *H04B 17/354* (2015.01); *H04W 4/44* (2018.02); *H04W 76/15* (2018.02)

(58) Field of Classification Search
CPC .. H04B 17/345; H04B 17/336; H04B 17/309; H04B 17/354; H04W 4/44; H04W 4/40; H04W 76/15; G06N 5/04; G06N 20/00; H04L 43/08; H04L 67/12
See application file for complete search history.

(56) References Cited

U.S. PATENT DOCUMENTS

| | | | | |
|---|---|---|---|---|
| 2017/0134961 | A1* | 5/2017 | Ghosh | H04W 16/14 |
| 2018/0020332 | A1 | 1/2018 | Kumabe | |
| 2018/0091252 | A1* | 3/2018 | Hayman | H04K 3/825 |
| 2018/0191775 | A1* | 7/2018 | Watson | H04L 63/1475 |
| 2019/0263336 | A1* | 8/2019 | Haga | G08G 1/0965 |
| 2020/0196269 | A1* | 6/2020 | Dzierwa | H04L 27/265 |
| 2020/0233060 | A1* | 7/2020 | Lull | G01S 7/40 |
| 2020/0334554 | A1* | 10/2020 | Takahashi | G06F 11/3065 |
| 2020/0364579 | A1* | 11/2020 | Misu | G06N 3/088 |
| 2020/0394927 | A1* | 12/2020 | Neubauer | H04W 4/40 |

(Continued)

FOREIGN PATENT DOCUMENTS

| | | |
|---|---|---|
| EP | 3576440 A1 | 12/2019 |
| EP | 3869841 A1 | 8/2021 |
| JP | 2017151610 A * | 8/2017 |

OTHER PUBLICATIONS

International Search Report and Written Opinion—PCT/US2022/041836—ISA/EPO—Dec. 6, 2022.

*Primary Examiner* — Sudesh M Patidar
(74) *Attorney, Agent, or Firm* — QUALCOMM Incorporated

(57) ABSTRACT

A radio frequency signal transfer anomaly notification method includes: determining, at a first roadside unit, presence of an anomaly of radio frequency signal transfer within a wireless communication range of the first roadside unit; determining a type of radio frequency signal transfer of the anomaly; and transmitting, from the first roadside unit to another entity, an anomaly indication indicative of the anomaly of radio frequency signal transfer and the type of radio frequency signal transfer of the anomaly.

31 Claims, 11 Drawing Sheets

(56) References Cited

U.S. PATENT DOCUMENTS

| | | | |
|---|---|---|---|
| 2021/0028874 A1* | 1/2021 | Yamaguchi | H04B 7/26 |
| 2021/0134074 A1* | 5/2021 | Fujita | G08G 1/017 |
| 2021/0344437 A1* | 11/2021 | Baracca | H04W 72/541 |
| 2022/0398933 A1* | 12/2022 | Roy | G05D 1/101 |

* cited by examiner

DETECTION OF RADIO FREQUENCY SIGNAL TRANSFER ANOMALIES

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Radio frequency signal transfer may be used for a variety of purposes. For example, signals may be transferred between mobile devices to determine locations and velocities of the mobile devices to implement safety precautions to avoid collisions between the mobile devices. As another example, satellite signals may be received by mobile devices and used to determine the locations and/or velocities of the mobile devices, and/or may be used to determine a present time. Various activities may inhibit the accurate measurement and/or decoding of radio frequency signals.

SUMMARY

In an embodiment, a radio frequency signal transfer anomaly notification method includes: determining, at a first roadside unit, presence of an anomaly of radio frequency signal transfer within a wireless communication range of the first roadside unit; determining a type of radio frequency signal transfer of the anomaly; and transmitting, from the first roadside unit to another entity, an anomaly indication indicative of the anomaly of radio frequency signal transfer and the type of radio frequency signal transfer of the anomaly.

In an embodiment, a first roadside unit includes: a transceiver; a memory; and a processor communicatively coupled to the transceiver and the memory and configured to: determine presence of an anomaly of radio frequency signal transfer within a wireless communication range of the first roadside unit; determine a type of radio frequency signal transfer of the anomaly; and transmit, to another entity, an anomaly indication indicative of the anomaly of radio frequency signal transfer and the type of radio frequency signal transfer of the anomaly.

In an embodiment, a first roadside unit includes: means for determining presence of an anomaly of radio frequency signal transfer within a wireless communication range of the first roadside unit; means for determining a type of radio frequency signal transfer of the anomaly; and means for transmitting an anomaly indication indicative of the anomaly of radio frequency signal transfer and the type of radio frequency signal transfer of the anomaly.

In an embodiment, a non-transitory, processor-readable storage medium includes processor-readable instructions to cause a processor of a first roadside unit to: determine presence of an anomaly of radio frequency signal transfer within a wireless communication range of the first roadside unit; determine a type of radio frequency signal transfer of the anomaly; and transmit an anomaly indication indicative of the anomaly of radio frequency signal transfer and the type of radio frequency signal transfer of the anomaly.

DETAILED DESCRIPTION

Figure 1:
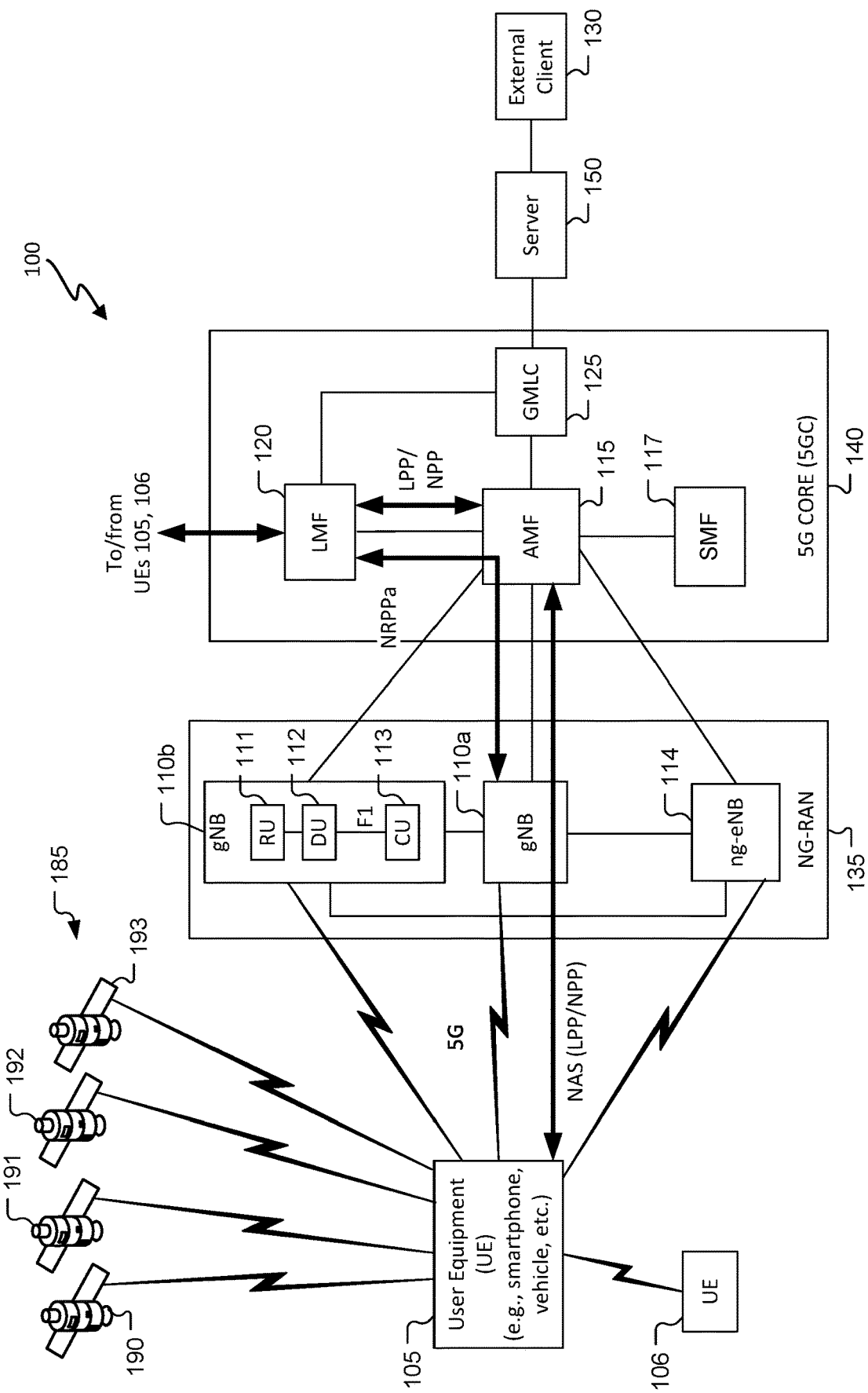
FIG. 1 is a schematic diagram of a connected-vehicle transaction system.

Techniques are discussed herein for detecting and mitigating anomalies with radio frequency signal transfer. For example, communication anomalies affecting devices such as on-board units using cellular vehicle-to-everything communications may be determined, e.g., based on determining that communication signals cannot be measured accurately, or that devices can communicate effectively in one region but not another, or that signals are accurately received from fewer devices than are known to be present, etc. Also or alternatively, satellite positioning system (SPS) anomalies affecting the ability of satellite positioning system receivers to determine location and/or time accurately may be determined, e.g., by comparing reported information (e.g., location, speed, velocity, time) and similar information determined independently of satellite signals. Regions affected by anomalies may be determined. Notifications of anomalies, anomaly types, and possibly regions affected by the anomalies may be provided. In response to detecting an anomaly or receiving notification of an anomaly, mitigating action may be taken. For example, in a cellular vehicle-to-everything communication environment, a vehicle may avoid regions affected by anomalies and/or may use one or more technologies other than the technology(ies) affected by the anomaly(ies) in order to communicate with other vehicles and/or to determine location of the vehicle and/or time.

Items and/or techniques described herein may provide one or more of the following capabilities, as well as other capabilities not mentioned. The use of anomalous signals for communication, location determination, and/or time determination may be avoided. Safety in a vehicle communication environment, e.g., in a vehicle-to-everything or cellular-vehicle-to-everything environment may be improved, e.g., by avoiding the use of anomalous signals for communication, location determination, and/or time determination, and/ or by using one or more technologies not affected by a communication anomaly to communicate and/or by using one or more technologies not affected by an SPS anomaly to determine location and/or time. An identified anomaly area may be avoided through coordination with one or more network entities (e.g., a roadside unit notifying a traffic management control which notifies one or more other roadside units which notify one or more entities such as vehicle user equipment). Other capabilities may be provided and not every implementation according to the disclosure must provide any, let alone all, of the capabilities discussed. It may be possible for an effect noted above to be achieved by means other than that noted, and a noted item/technique may not necessarily yield the noted effect.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more BSs, e.g., one or more of the gNBs 110a, 110b and/or the ng-eNB 114 may be configured to communicate with the UE 105 via multiple carriers. Each of the gNBs 110a, 110b and the ng-eNB 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110a, 110b, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multicarrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to an origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g. the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The gNBs 110*a*, 110*b* and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110a, 110b and/or the ng-eNB 114 may include a radio unit (RU), a distributed unit (DU), and a central unit (CU). For example, the gNB 110a includes an RU 111, a DU 112, and a CU 113. The RU 111, DU 112, and CU 113 divide functionality of the gNB 110a. While the gNB 110a is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110a. The DU 112 hosts the Radio Link Control (RLC), Medium Access Control (MAC), and physical layers of the gNB 110a. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110a. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110a, 110b and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110a, 110b (e.g., via the RU 111, the DU 112, and the CU 113) and/or the ng-eNB 114, and/or the LMF 120. As another example, the UE 105, one or more of the gNBs 110a, 110b (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
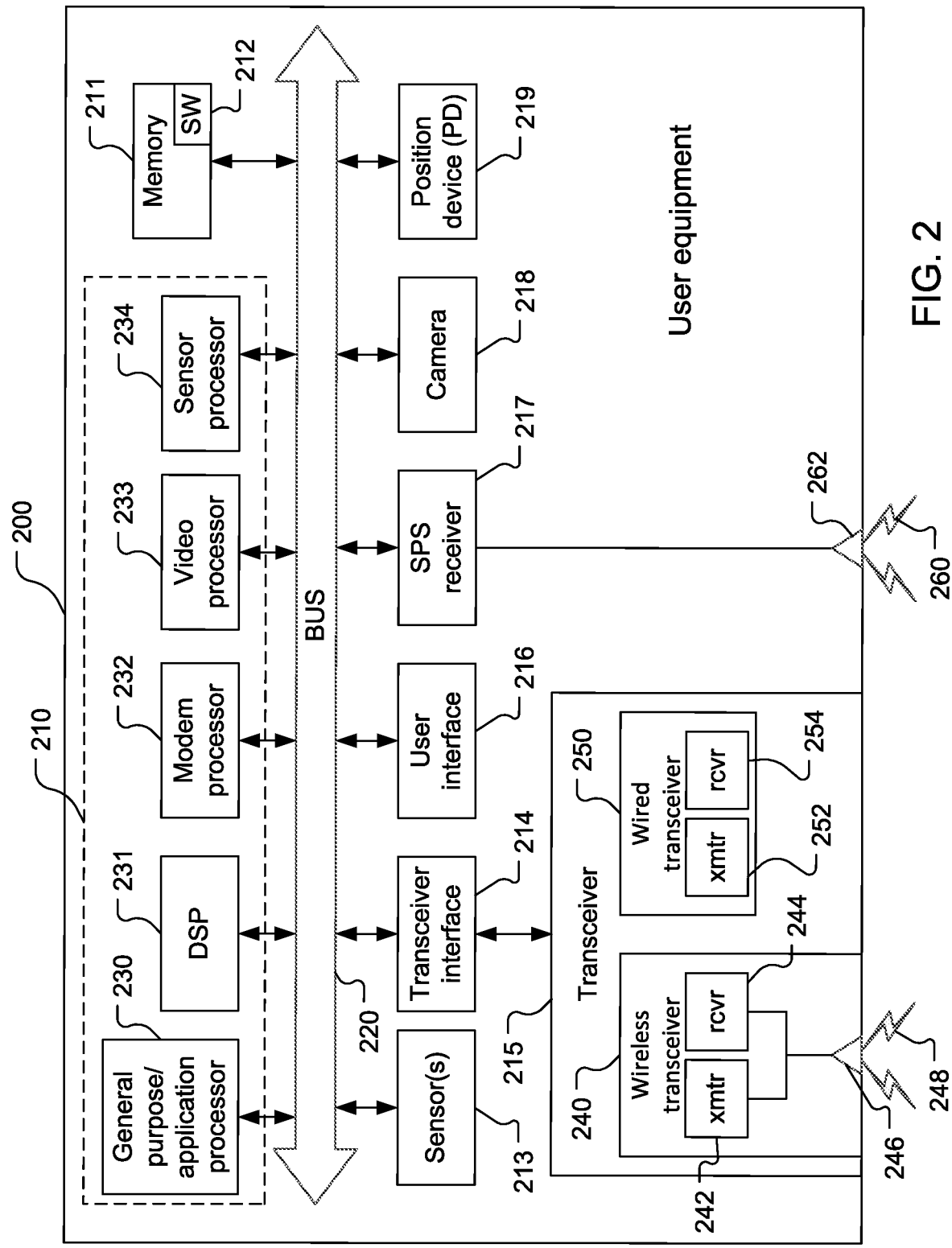
FIG. 2 is a block diagram of components of an example of a user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general purpose/application processor 230, the transceiver 215, the SPS receiver 217, and/or another component of the UE 200, and may be provided by hardware, software, firmware, or various combinations thereof.

Figure 3:
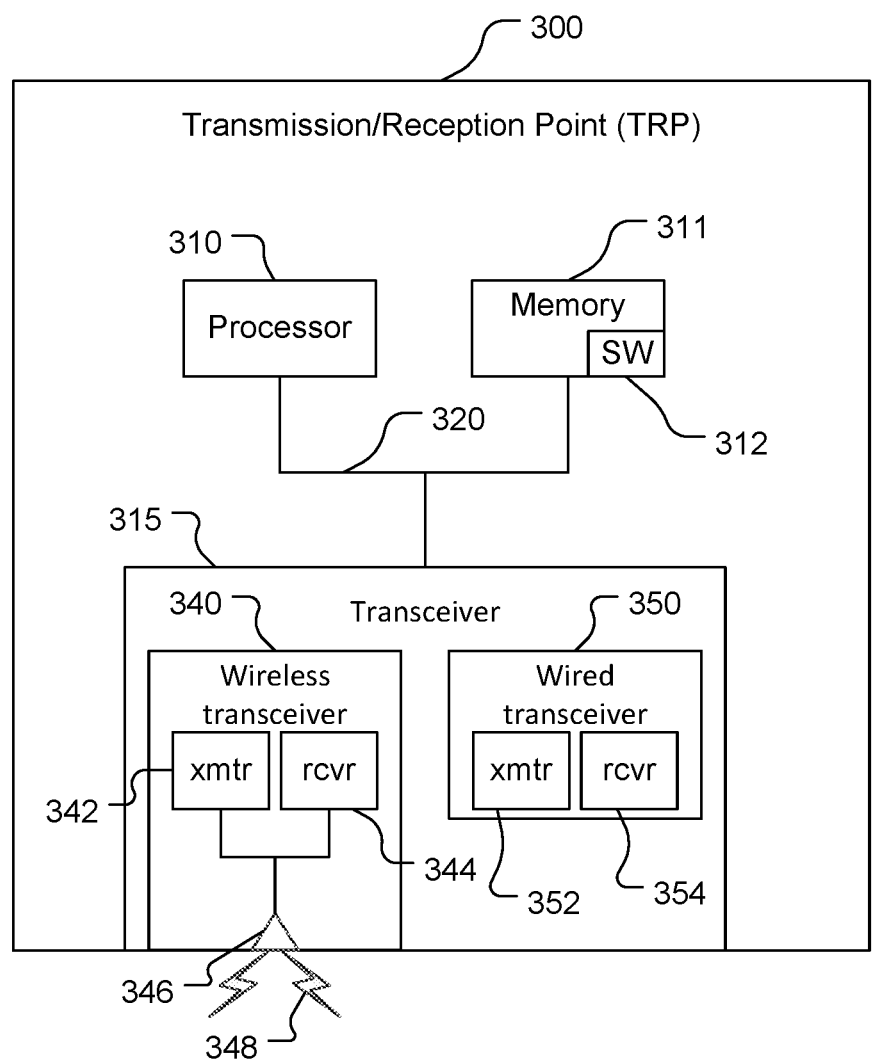
FIG. 3 is a block diagram of components of an example transmission/reception point.

Referring also to FIG. 3, an example of a TRP 300 of the gNBs 110a, 110b and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the gNBs 110a, 110b and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
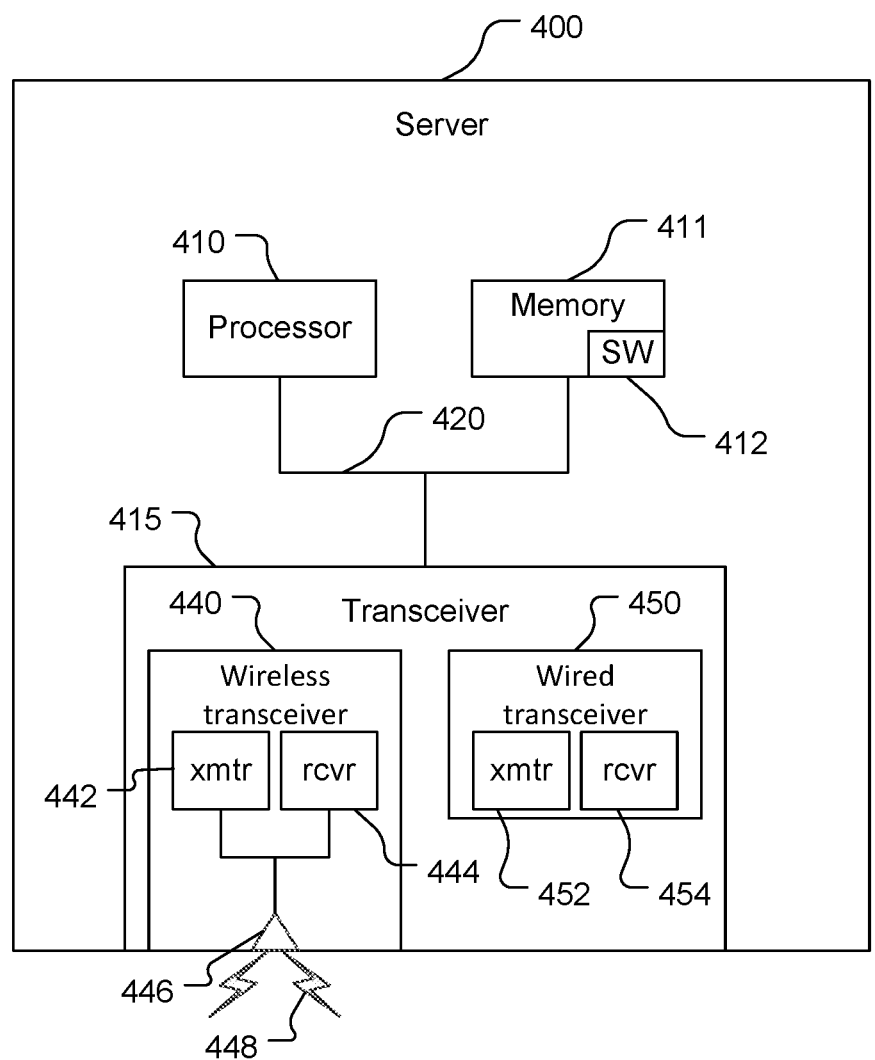
FIG. 4 is a block diagram of components of an example of a server shown in FIG. 1.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Anomaly Detection and Mitigation for Mobile Device Safety

Using C-V2X technology, vehicles can communicate with other vehicles and other entities. Vehicles can use C-V2X to broadcast safety messages such as a BSM (basic safety message) and/or a CAM (cooperative awareness message) to other C-V2X-enabled entities. 5G V2X technology introduces capabilities that enable advanced safety use cases that complement the BSM. Advanced safety use cases include cooperative sharing of sensor information via messages such as a Sensor Data Sharing Message (SDSM) or a Cooperative Perception Message (CPM). Vehicles use C-V2X messages for safety applications (e.g., collision avoidance) and thus guarding against C-V2X communications such as SDSM, CPM, and/or maneuver-sharing messages is important. For example, guarding against anomalies in a communication medium (e.g., ensuring an RF channel is not jammed) and/or regarding SPS signaling (e.g., for location and timing information (to ensure that a vehicle has sufficiently accurate location and timing information)) is important. Due to, for example, an intentional attack or unintentional interference, an on-board unit (OBU) (e.g., of a vehicle) may experience a communication anomaly and/or an SPS anomaly, resulting in various degrees of degradation of service of RF signal transfer (e.g., degradation of an ability to accurately interpret, decode, or measure a received RF communication signal and/or degradation of an ability to measure a received SPS signal). For example, RF jamming may render an RF channel unavailable for transfer of safety messages. As another example, SPS spoofing and/or malfunctioning may render sufficiently accurate location (including location over time, e.g., speed and/or velocity) and/or timing information unavailable. A communication anomaly affects an ability of a communication signal to be accurately interpreted, decoded, and/or measured. An SPS anomaly affects an ability of an SPS receiver to measure an SPS signal accurately (e.g., with an acceptable precision for location and time).

Radio frequency jamming may be intentional or unintentional. Intentional jamming may be used for a variety of purposes to interfere with communication between entities because roadside units, OBUs, and UEs all use the same 20 MHz band for communication. For example, RF jamming may be introduced to try to create chaos or collisions. V2X communications are used for safety purposes (and other purposes) such as for detection of location of other entities/objects, maneuver determination, collision avoidance, etc. RF jamming can prevent or delay communication, which may negatively affect safety measures that would be taken absent the jamming. Intentional jamming may also be used to attempt to thwart toll collection using V2X communications. RF jamming may be intentionally introduced to attempt to inhibit accurate vehicle tracking (e.g., to prevent accurate fleet management in order to, for example, avoid mandatory rest requirements of truck drivers, or avoid detection of vehicle taking an improper or unauthorized route, or avoid detection of an improper or unauthorized break, etc.). Unintentional RF jamming results from signals transmitted for non-jamming purposes that interfere with the V2X communication. For example, transmissions for a WiFi hotspot may leak from an adjacent frequency channel into the band of V2X communications. As another example, harmonics of signal transmissions may interfere with V2X communications.

SPS signal anomalies may also be intentional or unintentional. For example, an SPS anomaly may be due to unintentional RF jamming. As another example, SPS signals may be intentionally spoofed to affect an ability to determine location and/or time accurately. An SPS receiver may use SPS signals to determine location of the SPS receiver and/or time. Sophisticated spoofing may spoof location without spoofing time, and introduce a small error in location that is sufficient to cause a problem (e.g., to induce a vehicle not to employ emergency braking when emergency braking is warranted).

Detecting and mitigating anomalies inhibiting signal transfer has challenges. For example, due to considerations such as cost, OBUs in vehicles may not be equipped to detect anomalies (e.g., RF jamming, SPS spoofing) affecting signal transfer. Further, even if some OBUs are capable of detecting such anomalies, mitigating the consequences of the anomalies may not be practicable at an OBU.

Roadside units (RSUs), however, may be used to perform anomaly detection and mitigation. Roadside units are often deployed in numbers to provide good coverage of roads to provide various services, particularly at safety-relevant locations. Due to the importance of safety-related information, the RSUs are secure, are able to determine high-quality data, and are able to make data available, e.g., be interconnected with each other for communicating the safety-related data. Because RSUs are typically static, RSUs will have more stable models of the RF environment around the RSUs than OBUs will, making the RSUs better suited for detecting anomalies. RSUs typically do not have the size and cost constraints of an OBU, and thus RSUs may be equipped with additional components for additional functionality compared to OBUs. For example, RSUs may have an antenna/receiver to listen to messages transmitted by the RSU using another antenna. RSUs may have more processing power (e.g., computational power) than OBUs. Techniques are discussed herein for RSUs to determine anomalies, e.g., that affect security and/or reliability of signal transfer (e.g., for safety reasons), and to take one or more mitigation steps, which may improve C-V2X performance.

Figure 5:
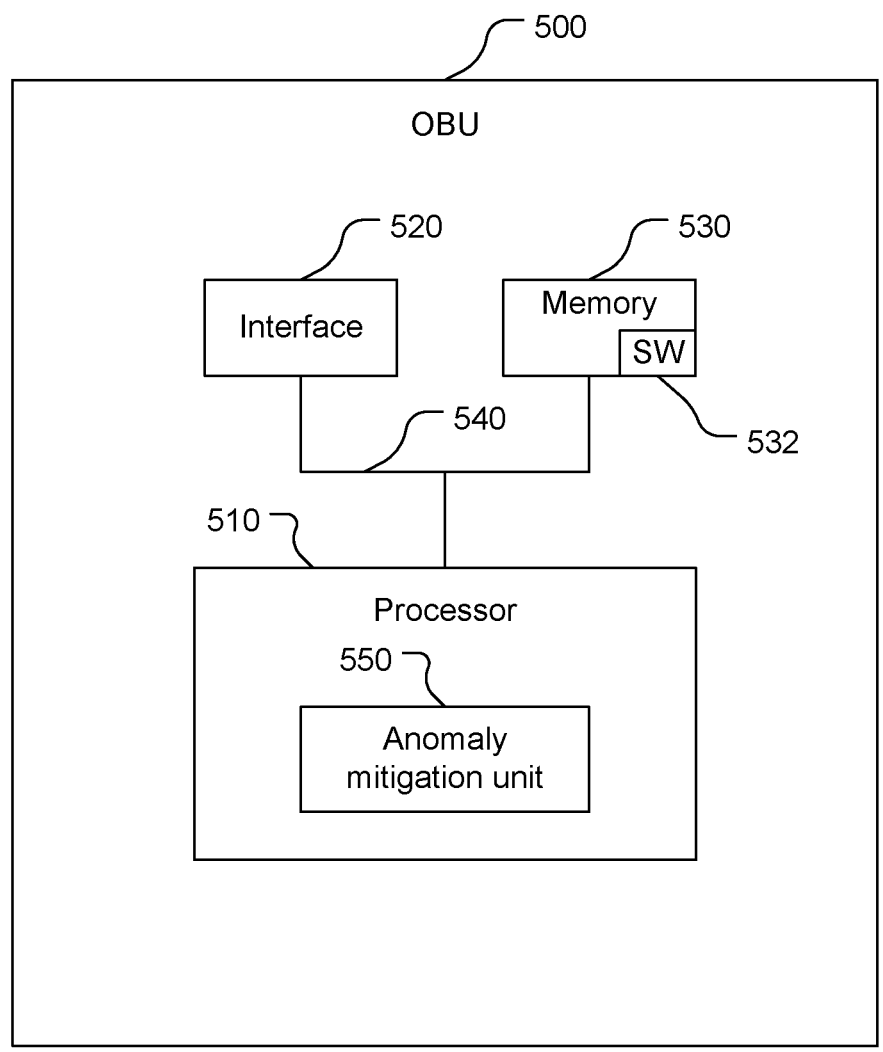
FIG. 5 is a block diagram of an example on-board unit.

Referring to FIG. 5, with further reference to FIGS. 1-4, an OBU 500 (on-board unit) includes a processor 510, an interface 520, and a memory 530 communicatively coupled to each other by a bus 540. The OBU 500 may include some or all of the components shown in FIG. 5, and may include one or more other components such as any of those shown in FIG. 2, and/or may communicate with one or more other devices (via the interface 520) with one or more features of the UE 200 (e.g., an IMU, a camera, sensors, etc.). The processor 510 may include one or more components of the processor 210. The interface 520 is configured to transmit and receive V2X signals, e.g., C-V2X signals (i.e., signals of a C-V2X format, e.g., for communication). The interface 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the interface 520 may include the wired transmitter 252 and/or the wired receiver 254. The interface 520 may include the SPS receiver 217 and the SPS antenna 262. The memory 530 may be configured similarly to the memory 211, e.g., including software 532 with processor-readable instructions configured to cause the processor 510 to perform functions. The OBU 500 may be a UE, such as the UE 200, that is also configured to communicate using C-V2X technology.

The description herein may refer to the processor 510 performing a function, but this includes other implementations such as where the processor 510 executes software (stored in the memory 530) and/or firmware. The description herein may refer to the OBU 500 performing a function as shorthand for one or more appropriate components (e.g., the processor 510 and the memory 530) of the OBU 500 performing the function. The processor 510 (possibly in conjunction with the memory 530 and, as appropriate, the interface 520) includes an anomaly mitigation unit 550. The configuration and functionality of the anomaly mitigation unit 550 is discussed further herein, with the OBU 500 being configured to perform the functionality described as being performed by the anomaly mitigation unit 550.

Figure 6:
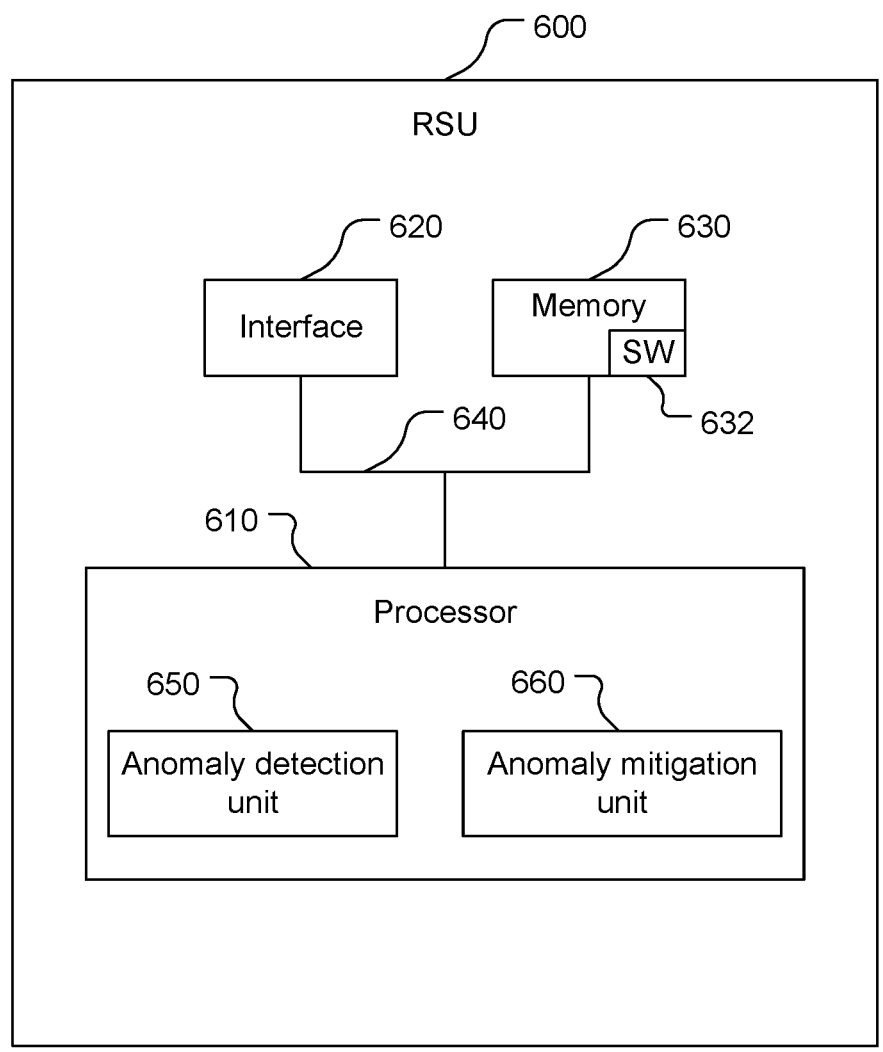
FIG. 6 is a block diagram of an example of a roadside unit.

Referring to FIG. 6, with further reference to FIGS. 1-2, an RSU 600 includes a processor 610, an interface 620, and a memory 630 (including software 632) communicatively coupled to each other by a bus 640. The RSU 600 may include some or all of the components shown in FIG. 6, and may include one or more other components such as any of those shown in FIG. 3. The description herein may refer only to the processor 610 performing a function, but this includes other implementations such as where the processor 610 executes software (stored in the memory 630) and/or firmware. The description herein may refer to the RSU 600 performing a function as shorthand for one or more appropriate components (e.g., the processor 610 and the memory 630) of the RSU 600 performing the function. The processor 610 (possibly in conjunction with the memory 630 and, as appropriate, the interface 620) may include an anomaly detection unit 650 and an anomaly mitigation unit 660. The anomaly detection unit 650 is configured to detect anomalies in RF signal transfer, e.g., reception of RF communication signals and/or reception of SPS signals. The anomaly mitigation unit 660 is configured to take one or more mitigation actions in response to the anomaly detection unit 650 detecting one or more anomalies. The configuration and functionality of the anomaly detection unit 650 and the anomaly mitigation unit 660 is discussed further herein, and the RSU 600 is configured to perform such functionality.

Figure 7:
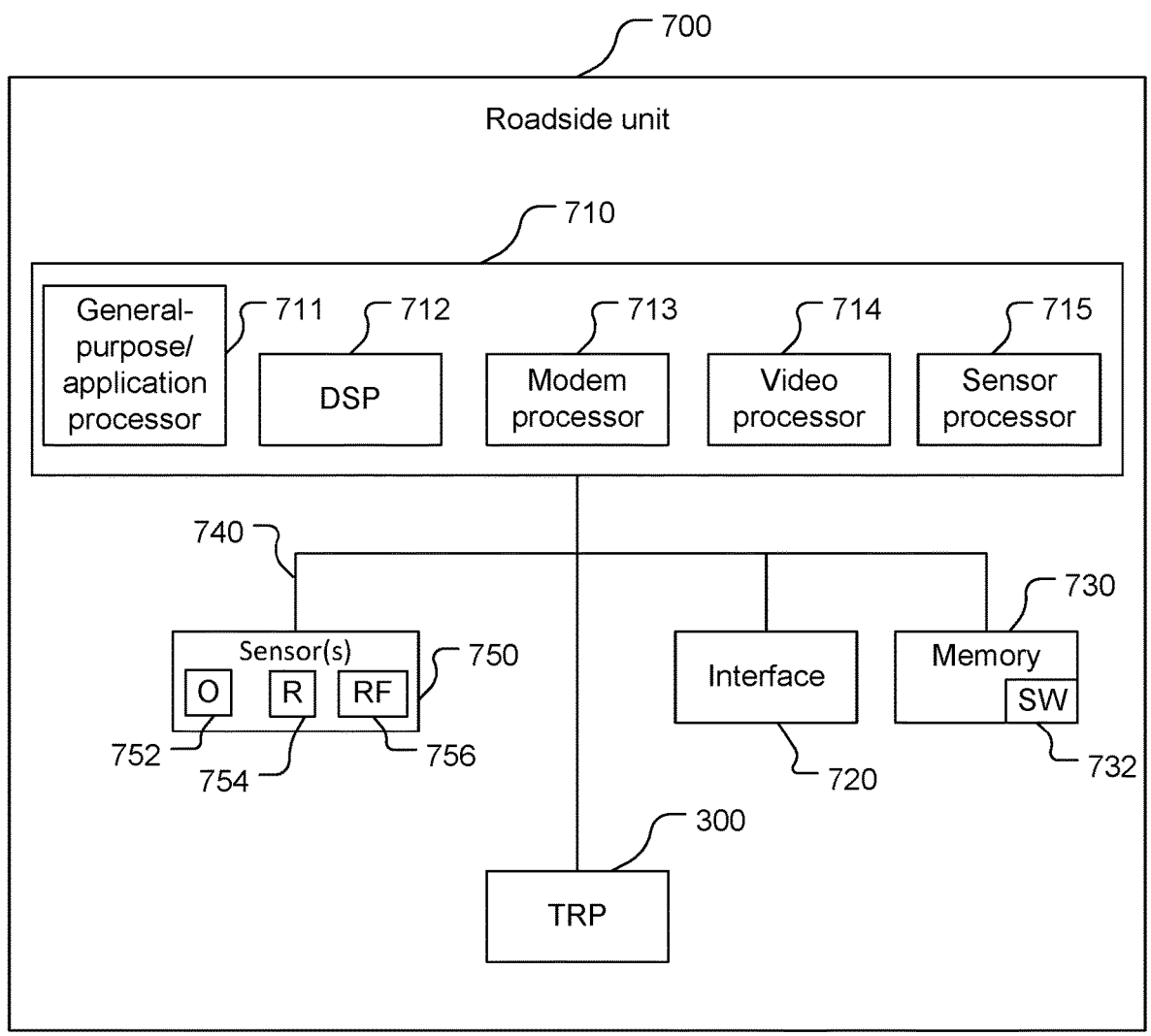
FIG. 7 is a block diagram of an example of the roadside unit shown in FIG. 6.

Referring also to FIG. 7, an RSU 700, which is an example of the RSU 600 shown in FIG. 6, includes a TRP 300, processor 710, one or more sensors 750, an interface 720, and a memory 730 communicatively coupled to each other by a bus 740. The RSU 700 may include some or all of the components shown in FIG. 7, and may include one or more other components. The processor 710 may serve as the processor 310 of the TRP 300 in the RSU 700.

The processor 710 may include one or more intelligent hardware devices, e.g., a central processing unit (CPU), a microcontroller, an application specific integrated circuit (ASIC), etc. The processor 710 may comprise multiple processors including a general-purpose/application processor 711, a Digital Signal Processor (DSP) 712, a modem processor 713, a video processor 714, and/or a sensor processor 715. One or more of the processors 711-715 may comprise multiple devices (e.g., multiple processors). For example, the sensor processor 715 may comprise, e.g., processors for radar, ultrasound, and/or lidar, etc. The memory 730 is a non-transitory storage medium that may include random access memory (RAM)), flash memory, disc memory, and/or read-only memory (ROM), etc. The memory 730 stores software 732 which may be processor-readable, processor-executable software code containing instructions that are configured to, when executed, cause the processor 710 to perform various functions described herein. Alternatively, the software 732 may not be directly executable by the processor 710 but may be configured to cause the processor 710, e.g., when compiled and executed, to perform the functions. The description may refer only to the processor 710 performing a function, but this includes other implementations such as where the processor 710 executes software and/or firmware. The description may refer to the processor 710 performing a function as shorthand for one or more of the processors 711-715 performing the function. The description may refer to the RSU 700 performing a function as shorthand for one or more appropriate components of the RSU 700 performing the function. The processor 710 and the processor 310 may share one or more components. The processor 710 may include a memory with stored instructions in addition to and/or instead of the memory 730. Functionality of the processor 710 is discussed more fully below.

The sensor(s) 750 may include an optical sensor 752, a range sensor 754, an RF sensor 756, and optionally one or more other sensors not shown. While only one optical sensor 752, one range sensor 754, and one RF sensor 756 are shown in FIG. 3, and referred to herein in the singular, the optical sensor 752 may include more than one optical sensor, the range sensor 754 may include more than one range sensor, and/or the RF sensor 756 may include more than one RF sensor. The optical sensor 752 may be configured to capture one or more images. For example, the optical sensor 752 may include one or more cameras configured to capture still images and/or video. The range sensor 754 is configured to measure ranges from the RSU 700 to objects such as UEs, OBUs, etc. The range sensor 754 may include, for example, a radar system, a sonar system, and/or a lidar system. The sensors 752, 754 are examples and not limiting of the description as numerous other types and/or quantities of sensors may be used. The RF sensor 756 may be disposed in or near an RF transaction region and configured to sense RF traffic associated with the RF transaction region.

The optical sensor 752 may include one or more cameras for capturing still or moving imagery. The camera(s) may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 711 and/or the DSP 712. Also or alternatively, the video processor 714 may perform conditioning, encoding, compression, and/or manipulation of signals representing captured images. The video processor 714 may decode/decompress stored image data for presentation on a display device (not shown).

The sensor(s) 750 and the processor 710 may for a perception system that can determine the presence, and possibly location(s), of one or more entities, e.g., vehicles. For example, one or more images from a camera of the optical sensor 752 may be analyzed to determine presence of one or entities. Radar, sonar, and/or lidar measurements may be used to detect entity presence and location. As another example, signal measurements, e.g., RSSI, RSRP, made by the RF sensor 756 may be used to determine a distance to an object, and location to the object if the signal measurements are directive, e.g., made using a beamforming antenna, or made by an antenna with a narrow beam directed in a known direction. In any of these ways, one or more objects containing OBUs may be perceived by the RSU 700 independently of whether RF communications are received from the OBUs.

The interface 720 includes one or more interface components in addition to the transceiver 315 of the TRP 300 of the RSU 700. For example, the interface 720 may include an antenna and a wireless receiver in addition to the transceiver 315.

The RSU 600 is configured to detect and mitigate anomalies affecting radio frequency signal transfer (e.g., communication signal reception and/or SPS signal reception). For example, the anomaly detection unit 650 may use one or more of a variety of techniques to determine the presence of an anomaly affecting communication and/or an anomaly affecting SPS operation. The anomaly detection unit 650 may be able to identify an anomaly zone 940 where one or more anomalies exist. The anomaly mitigation unit 660 may notify one or more other RSUs and/or one or more OBUs and/or a server such as a TMC 950 (traffic management center) and/or one or more other entities of the determine anomaly(ies). The anomaly mitigation unit 660 may affect operation of the RSU 600 based on the anomaly detection unit 650 determining one or more anomalies. For example, the anomaly mitigation unit 660 may cause the processor 610 to use one or more technologies other than C-V2X to determine information (e.g., location, velocity, etc.) regarding devices near the RSU 600.

Figure 8:
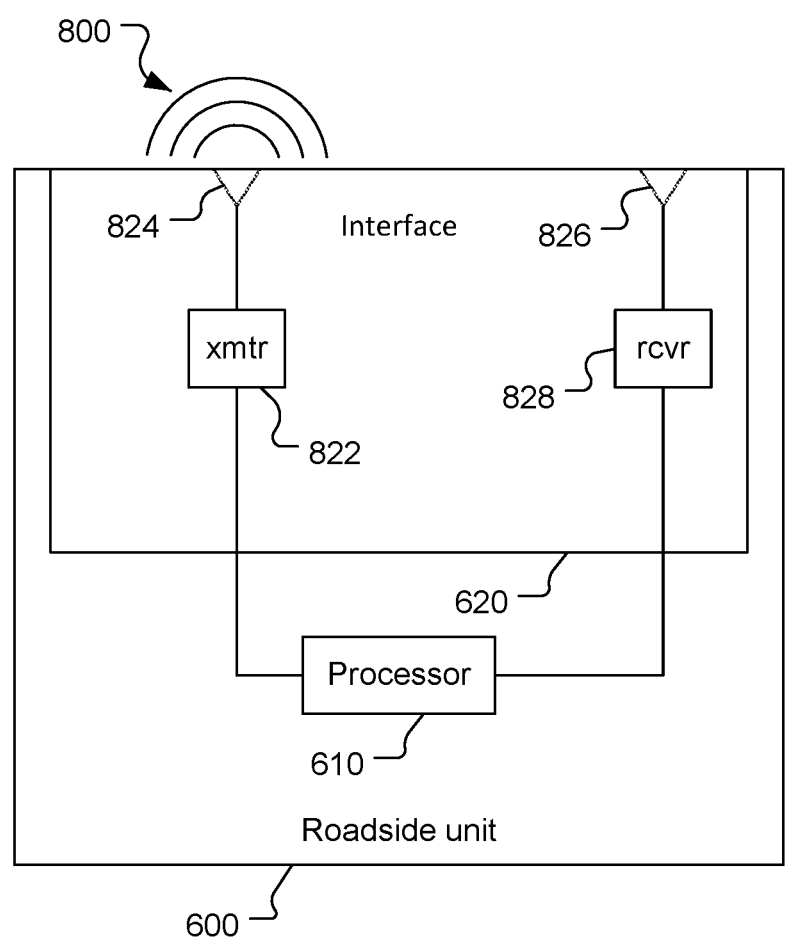
FIG. 8 is a block diagram of portions of the roadside unit shown in FIG. 6 used to detect a communication anomaly.

Referring also to FIG. 8, the anomaly detection unit 650 may be configured to determine whether a communication anomaly is present at the RSU 600 by determining whether the RSU 600 can hear communication signals transmitted by the RSU 600. The processor 610 may transmit communication signals 800 (e.g., V2X signals such as C-V2X signals) via a wireless transmitter 822 and an antenna 824 of the interface 620 (e.g., the wireless transmitter 342 and the antenna 346 of the TRP 300). The processor 610 listens for the communication signals 800. If the communication signals 800 are received by an antenna 826 and a wireless receiver 828 with sufficient quality (e.g., meeting one or more quality metrics such as a threshold SNR (signal-to-noise ratio), a threshold SINR (signal-to-interference-plus-noise ratio), etc.), then the anomaly detection unit 650 may conclude that no communication anomaly is present at the RSU 600. If the communication signals 800 are not received by the antenna 826 and the wireless receiver 828 with sufficient quality, then the anomaly detection unit 650 may conclude that a communication anomaly is present at the RSU 600. In this way, adding a second radio receiver to a vehicle (which may be cost prohibitive) may be avoided while providing a way to detect communication anomalies at the RSU 600 (which may be assumed to span an area around the RSU 600).

Also or alternatively, the anomaly detection unit 650 may analyze physical RF properties to identify anomalies. For example, the anomaly detection unit may analyze a channel busy ratio (CBR) of a communication channel to determine whether a communication anomaly is present at the RSU 600. For example, the anomaly detection unit 650 may determine that a communication anomaly exists at the RSU 600 based on the CBR of a communication channel (e.g., a C-V2X channel) being above a threshold CBR. A jamming signal may make measuring signals difficult, causing the CBR to be high such that a CBR that is above a threshold CBR is indicative of a jamming signal. A CBR threshold may, for example, be 80% or 90% because algorithms are typically employed to keep the CBR at about 60%, while 100% corresponds to the channel being fully occupied. As another example, the anomaly detection unit 650 may analyze Channel State Information (CSI) to determine whether an anomaly exists, with CSI indicating high channel traffic volume (especially a rapid increase in channel traffic volume) being suggestive or indicative of an anomaly (e.g., jamming).

Figure 9:
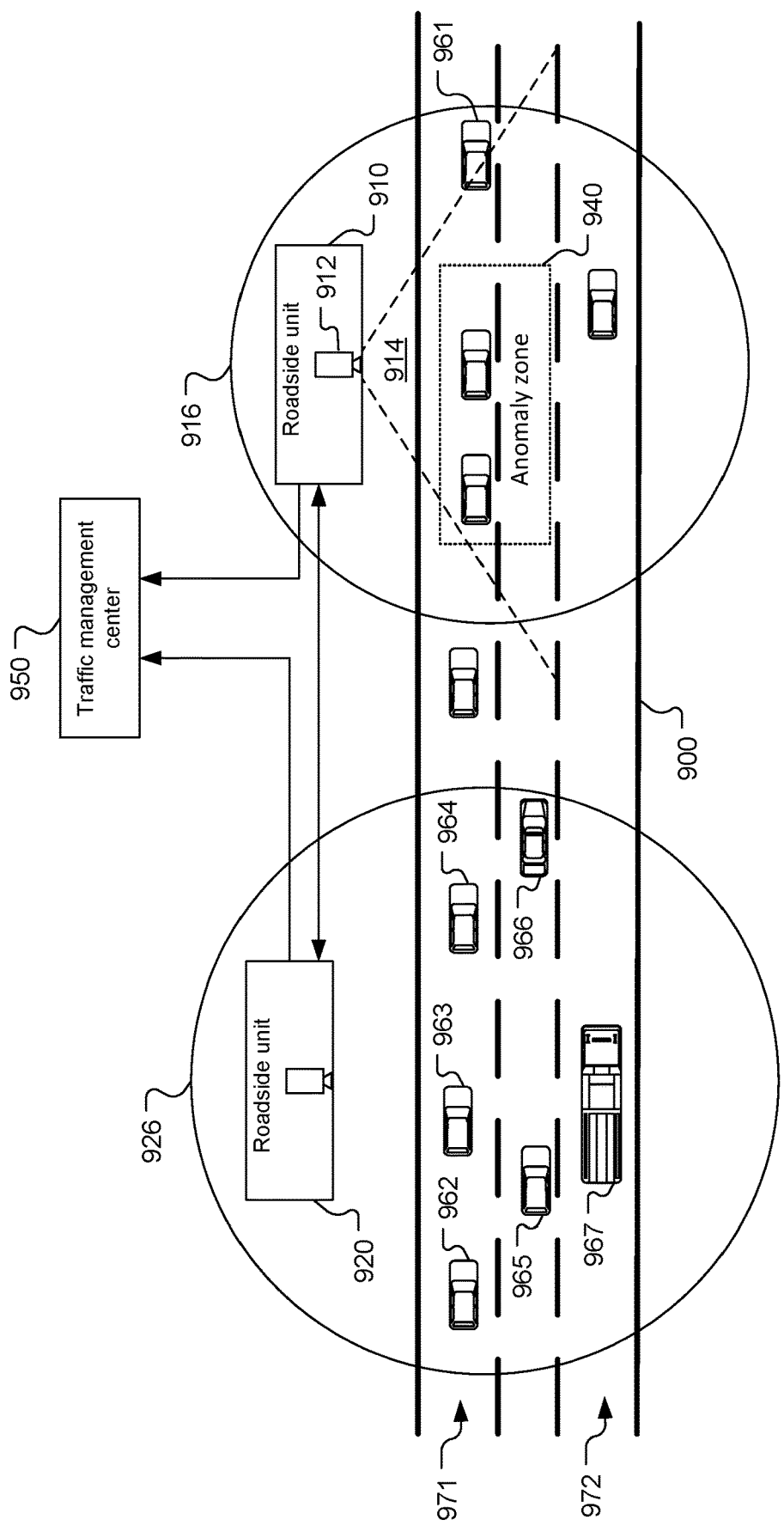
FIG. 9 is a top view of a vehicle communication environment.

Also or alternatively, the anomaly detection unit 650 may be configured to use one or more sensor measurements in combination with received communication signals, or lack thereof, to determine whether a communication anomaly exists near the RSU 600. For example, referring also to FIG. 9, an RSU 910 (which is an example of the RSU 700) can use one or more sensors to monitor a region near the RSU 910. For example, the processor 710 of the RSU 910 may analyze one or more images captured by a camera 912 (of the optical sensor 752 of the RSU 910) with a field of view 914. The processor 710 can analyze the image(s) to determine a quantity of OBUs within the field of view 914 and within a communication region 916 of the RSU 910. The communication region 916 is an area within which an OBU can communicate with the RSU 910 absent jamming or other communication inhibitor. Similarly, the processor 710 may use one or more measurements from the range sensor 754 (e.g., one or more radar measurements, one or more sonar measurements, and/or one or more lidar measurements) to determine the quantity of OBUs within the communication region 916. The processor 710 may combine measurements from different sensors to determine the quantity of OBUs in the communication region 916. The anomaly detection unit 650 may determine that a communication anomaly is present in the communication region 916 based on the RSU 910 receiving communications from fewer than the quantity of OBUs determined to be in the communication region 916, or more than a threshold quantity fewer than the quantity of OBUs determined to be in the communication region 916. Thus, if the quantity of OBUs determined to be in the communication region 916 and from which communication is expected is M, and the quantity of OBUs from which communications are received is N, then the anomaly detection unit 650 may determine that a communication anomaly is present if N is less than M. The quantity M may be lower than a quantity of objects detected in the communication region 916. For example, the quantity M may be determined as a percentage P of the total quantity of objects in the communication region 916, e.g., with the percentage P being a typical percentage of total objects that are capable of communication, e.g., V2X communication, minus a margin of error. Alternatively, the anomaly detection unit 650 may determine that a communication anomaly is present if N is less than M−P, where P is a non-zero integer used as a margin of error for determining presence of a communication anomaly.

Also or alternatively, the anomaly detection unit 650 may be configured to use analytics and coordination with one or more other RSUs and/or a server (e.g., a traffic management center) to determine whether a communication anomaly exists near the RSU 600. For example, an RSU 920 that is communicatively coupled with the RSU 910 and disposed such that OBUs within a communication region 926 of the RSU 920 may be relevant to the RSU 910. In this example, the RSU 920 is disposed along a road 900 along which the RSU 910 is disposed, with the RSU 920 disposed upstream from the RSU 910 such that vehicles 961, 962, 963, 964, 965, 966, 967 will pass the RSU 920 before passing the RSU 910. The RSU 920 may transmit a message to the RSU 910 indicating a quantity R of OBUs from which the RSU 910 received communications over a first period of time of length T. The anomaly detection unit 650 can determine a quantity Q of OBUs from which the RSU 910 receives communications over a second period of time of length T, with the processor 710 initiating the second period of time at an appropriate delta in time from the beginning of the first period of time. For example, the processor 710 can factor in the present speed of the vehicles 961-967 and the distance from the communication region 926 to the communication region 916 to determine when to begin the second period of time. If, during the second time period, the RSU 910 receives communications from fewer OBUs than the RSU 920 (i.e., if Q<R), or fewer than a threshold quantity fewer OBUs than the RSU 920 (i.e., if Q<R−D, where D is a non-zero integer), e.g., if the RSU 910 receives no communications from OBUs, then the anomaly detection unit 650 of the RSU 910 may determine that there is a communication anomaly present in the communication region 916. If, during the second time period, the RSU 910 receives communications from more OBUs than the RSU 920 (i.e., if Q>R), or more than a threshold quantity more OBUs than the RSU 920 (i.e., if Q>R+E, where E is a non-zero integer), then the anomaly detection unit 650 of the RSU 910 may determine that there is a communication anomaly present in the communication region 926 and transmit a message to the RSU 920 to this effect. These examples assume there is no expected change in the quantity of vehicles between the communication region 926 and the communication region 916. These examples may be adjusted for an expected change in quantity of OBUs from the communication region 926 to the communication region 916 (e.g., a decrease in OBUs if there is an exit between the communication regions 916, 926, or an increase in OBUs if there is an entrance between the communication regions 916, 926). As another example, the RSU 910 may receive an indication from the TMC 950 of an expected quantity of OBUs to enter the communication region 916 over the second period of time.

The anomaly detection unit 650 may be configured to use other analytics and coordination with one or more other RSUs and/or a server to determine whether a communication anomaly exists near the RSU 600. For example, the RSU 600 may obtain space-time information regarding OBUs within a region. For example, the RSU 910 may obtain a space-time diagram from the TMC 950 or other source (e.g., a mapping application server) indicative of traffic conditions in the communication region 916 and determine whether communication is received from an expected quantity of OBUs in view of the indicated traffic condition in the communication region 916. If communications are received from fewer OBUs than expected, then the RSU 910 may determine that a communication anomaly exists in at least a portion of the communication region 916. The RSU 910 may conclude that a communication anomaly exists throughout the communication region 916 (or at least throughout portions of lanes 971, 972 in the communication region 916) if no communications are received when at least one communication is expected.

The anomaly detection unit 650 may be configured to use combinations of techniques to determine whether a communication anomaly is present. For example, the anomaly detection unit 650 may determine whether a determination of presence of an anomaly based on one or more sensor measurements and agrees with a determination of presence of an anomaly based on analytics and coordination with the RSU 920 or a server.

The anomaly detection unit 650 may be configured to determine a location affected by a communication anomaly. For example, the processor 710 may use one or more images captured by the camera 912 to identify an OBU from which communication is not received (at least with desired quality) and use one or more sensor measurements (e.g., the one or more images, radar measurement(s), sonar measurement(s), and/or lidar measurement(s)) to determine the location of the OBU when the lack of communication occurs. For example, the processor 710 may be able to determine a vehicle type (e.g., emergency vehicle (e.g., police car, fire truck), sedan, truck, motorcycle, etc.) and determine whether communication is received from such a vehicle type. If communication is not received from the identified vehicle type, then the location of that vehicle type may be used as a location affected by a communication anomaly. For example, the processor 710 may determine a location of an OBU from an image by identifying an angle of the OBU relative to the camera 912 by a position of a vehicle including the OBU in the image. The processor 710 may determine a distance from the RSU 910 to the OBU based on a size of the vehicle containing the OBU in the image and knowledge of a size of the vehicle (e.g., size of a car, truck, motorcycle, etc.). The processor 710 may combine the angle and distance to determine the location of the OBU. As another example, the processor 710 may determine a location of an OBU by determining a location of the entity containing the OBU relative to a reference location (e.g., relative to another entity (e.g., a vehicle) with a known location, a location of a landmark contained in map data stored in the memory 730, etc.). For example, the processor 710 may determine that a vehicle is on a reference location of the road 900 (e.g., a marking with a known location), or in a known region (e.g., in a specific lane of the road 900, etc.). The processor 710 may be able to compare reported locations to locations determined by other means, e.g., sensor measurements, determine that an anomaly exists based on the reported and other locations not matching, and determine an anomaly area based on the locations determined by other means. The processor 710 may compile locations affected by communication anomaly to determine a boundary of the anomaly zone 940. The anomaly zone 940 is shown as a rectangle for simplicity, but other shapes (regular or irregular) may be determined. The processor 710 may be configured to use a regular shape for anomaly zones, e.g., a smallest rectangle that will include the determined locations affected by communication anomaly. The processor 710 may identify the anomaly zone 940 as a communication anomaly zone, e.g., so that the anomaly zone 940 may be distinguished from an SPS anomaly zone in which SPS signal reception is compromised.

The anomaly detection unit 650 may be configured to determine presence of an SPS anomaly (i.e., an anomaly that affects performance of an SPS receiver of the OBU 500, e.g., inhibiting accurate measurement of satellite signals). The anomaly detection unit 650 may be configured to determine that an SPS anomaly exists based on a discrepancy between SPS-based information and similar information determined independently of SPS signaling.

The anomaly detection unit 650 may, for example, be configured to determine that an SPS anomaly exists based on a location indicated by the OBU 500 and a perceived location of an entity (e.g., a vehicle) containing the OBU 500 being different. For example, the processor 710 may determine locations of entities containing OBUs using one or more measurements by the sensor(s) 750 as discussed above. The processor 710 of the RSU 910 may receive a message from an OBU in the communication region 916, with the message including a location of the OBU determined by an SPS receiver of the OBU. The processor 710 may determine that an SPS anomaly exists if the reported location of an OBU in the message differs by more than a threshold distance from the perceived location of the entity containing the OBU that sent the message. Also or alternatively, the processor 710 may determine that an SPS anomaly exists based on the reported location and the perceived location being identifiably distinct, e.g., the reported location being in a left-most lane 971 of the road 900 and the perceived location being in a right-most lane 972 of the road 900. As another example, the processor 710 may determine that that an SPS anomaly exists based on at least a threshold quantity of differences between reported and perceived locations differing by more than the threshold distance (and may not determine that an SPS anomaly exists if fewer than the threshold quantity of differences are determined).

The anomaly detection unit 650 may, as another example, be configured to determine that an SPS anomaly exists based on a time indicated by the OBU 500 and an independently-determined time being different. The processor 710 may determine that an SPS anomaly exists if the reported time by the OBU 500 differs by more than a threshold time from the independently-determined time, e.g., from a cellular network.

The anomaly detection unit 650 may, as another example, be configured to determine that an SPS anomaly exists based on reported kinematic information for the OBU 500 and perceived kinematic information for an apparatus containing the OBU 500 being different. For example, the OBU 500 may report a velocity or speed for the OBU 500 and the processor 710 may determine velocity or speed of an apparatus containing the OBU 500 by analyzing images captured by the optical sensor 752, and/or analyzing radar, sonar, and/or lidar information. If a discrepancy exists between the reported and perceived kinematic information, i.e., the determined kinematic information differs (or differs by more than a threshold amount) from the reported kinematic information, then the processor 710 may determine that an anomaly exists. The processor 710 may determine that an anomaly exists based on a threshold number of discrepancies being determined, e.g., corresponding to the same region.

The anomaly detection unit 650 may be configured to determine a location affected by an SPS anomaly. For example, if an SPS anomaly is detected, the processor 710 may use the perceived location as a location affected by the SPS anomaly. The processor 710 may compile locations affected by SPS anomaly to determine a boundary of an anomaly zone, e.g., the anomaly zone 940.

The anomaly detection unit 650 may determine the existence of anomalies at a physical layer of the RSU 600. Also or alternatively, anomalies may be detected outside of the physical layer of the RSU 600. For example, information from which anomalies may be determined may be provided to an application layer of the RSU 600 and the application layer may determine the existence of an anomaly. As another example, information from which anomalies may be determined may be provided to a location services (LCS) client and the LCS client may determine the existence of an anomaly.

The anomaly mitigation unit 660 may take one or more mitigating actions in response to determining that one or more RF signal transfer anomalies (a communication anomaly and/or an SPS anomaly) exist. For example, the processor 610 may transmit an anomaly message indicating the type of anomaly, and perhaps indicating the region, if known, affected by the anomaly, e.g., the anomaly zone 940. If no region is indicated for the anomaly, the communication region of the reporting RSU, e.g., the communication region 916 if the anomaly message is transmitted by the RSU 910, may be assumed. The processor 610 may transmit the message to one or more other entities. For example, the RSU 910 may transmit the message to one or more other RSUs (e.g., neighboring RSUs such as the RSU 920), to one or more servers (e.g., the TMC 950), to one or more OBUs within the communication region 916 (e.g., over a Wave Service Advertisement (WSA) channel), and/or to one or more other entities. A mitigation message transmitted by the RSU 600 may indicate one or more mitigating actions to be taken (e.g., to avoid the anomaly region, to discount or not use SPS-determined location in the anomaly region, to use communication technology other than the communication technology affected by a communication anomaly, etc.). The processor 610 may transmit a notification to the OBU 500 of a discrepancy, e.g., between reported and perceived kinematic information for the OBU 500. The TMC 950 may take mitigating action such as revoking an ability of the OBU 500 to report information (e.g., location, kinematic information, etc.) based on the OBU 500 consistently reporting (e.g., in communication regions of different RSUs) information that differs from independently-determined information, especially if similar information reported by other OBUs agrees with independently-determined information.

An entity receiving an anomaly message may transmit a corresponding anomaly message to one or more further entities. For example, the RSU 920 may receive an anomaly message from the RSU 910, and transmit a corresponding anomaly message (e.g., using WWAN or C-V2X over a Uu interface, e.g., for the WSA channel) to OBUs within the communication region 926. As another example, the TMC 950 may receive an anomaly message from the RSU 910, and transmit a corresponding anomaly message through a communication network to one or more RSUs with which the RSU 910 is not in direct communication, but for which the anomaly message may be relevant (e.g., due to vehicles passing by the other RSU being likely to pass the RSU 910). Also or alternatively, the TMC 950 may transmit one or more communications through a cellular interface to warn mobile devices.

As another example, the anomaly mitigation unit 660 may respond to detection of an SPS anomaly by proactively transmitting location reference information to OBUs. For example, the RSU 600 may transmit, via the interface 620, the location of the RSU 600. Also or alternatively, the RSU 600 may transmit positioning reference signals that may be measured by OBUs to determine distance (and possibly direction) to the RSU 600. Also or alternatively, the RSU 600 may transmit one or more other signals (e.g., a communication signal of a known or indicated transmit power) that may be measured by the OBU 500 to determine distance to the RSU 600.

The OBU 500 may take one or more mitigating actions in response to receiving an anomaly message, and/or in response to lack of reception of a health status message. For example, the anomaly mitigation unit 550 may cause the OBU 500 to use a communication technology other than V2X when the OBU 500 is in an area of a communication anomaly. As another example, the anomaly mitigation unit 550 may respond to notice of a communication anomaly by causing the OBU 500 to use a technology other than V2X (e.g., radar, sonar, lidar, and/or image analysis, etc.) to determine presence, and possibly location relative to the OBU 500, of objects. As another example, the anomaly mitigation unit 550 may respond to notice of an SPS anomaly by causing the OBU 500 to use a technology other than SPS (e.g., 5G-based positioning (e.g., round-trip-time (RTT) measurements and trilateration, etc.) to determine location of the OBU 500. As another example, the anomaly mitigation unit 550 may respond to notice of an SPS anomaly by using cellular technology to determine time, and to respond to an inability to determine time using cellular technology, to communicate with one or more other V2X devices (e.g., C-V2X devices) to obtain time. As another example, the anomaly mitigation unit 550 may suggest an alternate route that avoids the region affected by the anomaly. The OBU 500, e.g., the anomaly mitigation unit 550, may monitor a WSA channel for an RF health status to determine whether mitigation is appropriate, e.g., taking mitigating action(s) for the communication region 916 based on a warning message received from the RSU 920 regarding the communication region 916, or based on lack of reception of a message (e.g., an RF health status message) from the RSU 910 while the OBU 500 is in the communication region 916.

Techniques discussed herein may be used in a wide variety of circumstances. For example, C-V2X communications may be used to communicate safety messages indicating safety-related information and/or information from which safety-related information may be determined. Safety-related information may include, for example, collision warnings, emergency vehicle warnings, a do-not-pass warning, emergency braking warnings, etc. Anomalies of signal transfer may inhibit the determination and/or communication of safety messages and thus obtaining of the safety-related information, which may result in collisions or other negative consequences (e.g., vehicles driving off roads, etc.). Using techniques discussed herein to determine anomalies of RF signal transfer and provide notification of the anomalies, mitigating actions may be taken to help avoid collisions or other negative consequences. For example, in response to notification of an anomaly, an OBU may avoid relying on RF communication and/or RF sensors in a region affected by an anomaly. As another example, the OBU may defer to one or more technologies not affected by the anomaly (e.g., changing to or relying more on radar, sonar, and/or lidar for determining OBU location, or changing to a communication mechanism other than C-V2X (e.g., changing to a radio using a Uu interface with a base station). As another example, the OBU may cause one or more actions by a device containing the OBU (e.g., causing a car to brake or otherwise increase distance between the car and another vehicle in front of the car, e.g., before entering the region affected by the anomaly). As another example, the OBU could notify a user of the device containing the OBU, e.g., a driver of a car to prompt the driver to take appropriate action (e.g., slowing the car, changing course to avoid the anomaly region, etc.). As another example, an RSU may inform an OBU that a location reported by the OBU was inaccurate. The OBU may thus take appropriate mitigating action such as disregarding SPS-determined location, e.g., until the OBU leaves the anomaly region, or for a probationary time (after which location accuracy may be checked), etc.

Figure 10:
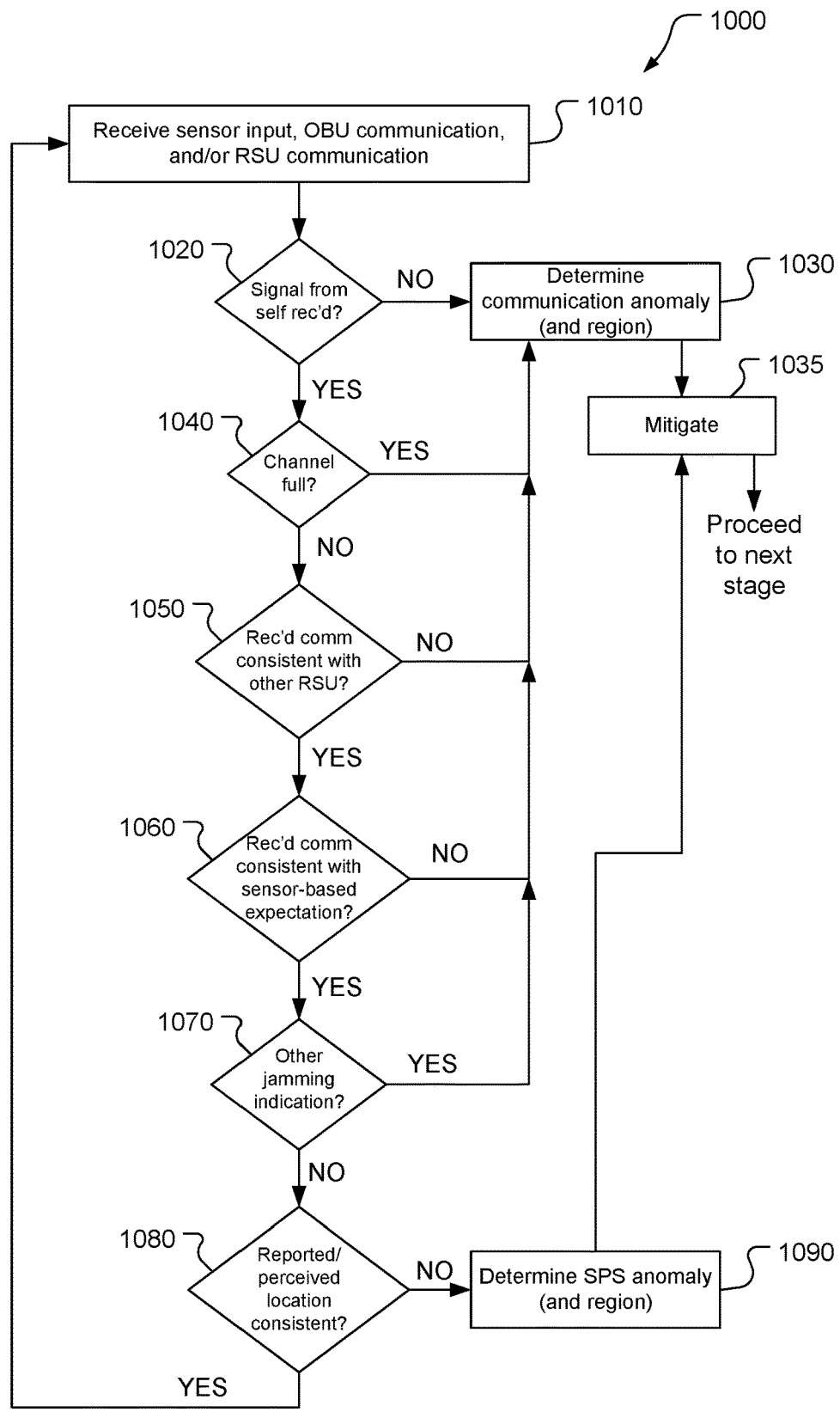
FIG. 10 is a block flow diagram of a method of detecting and mitigating radio frequency signal transfer anomalies.

Referring to FIG. 10, with further reference to FIGS. 1-9, a method 1000 of detecting one or more RF signal transfer anomalies and mitigating effects of the anomaly(ies)

includes the stages shown. The method 1000 is, however, an example only and not limiting. The method 1000 may be altered, e.g., by having stages added, removed, rearranged, combined, performed concurrently, and/or having single stages split into multiple stages. For example, stages 1020, 1040, 1050, 1060, 1070, 1080 are optional such that the method 1000 may include a few as one of the stages 1020, 1040, 1050, 1060, 1070, 1080.

At stage 1010, the RSU 600 receives sensor input, OBU communication, and/or RSU communication. For example, the sensor(s) 750 may capture one or more images, obtain one or more range and/or direction measurements (e.g., radar, lidar, and/or sonar measurements), and/or obtain one or more RF signal measurements (e.g., RSSI, etc.). Also or alternatively, the interface 620 may receive one or more messages in the form of RF signals from one or more OBUs, e.g., OBUs contained in vehicles within communication range of the RSU 600 (e.g., in the communication region 916 for the RSU 910). The message(s) may indicate, for example, OBU location and/or time. Also or alternatively, the RSU 600 may receive one or more messages from one or more other RSUs, with the messages indicating, for example, a quantity of OBUs from which messages were received with desired quality (e.g., of sufficient quality to be interpreted, decoded, and/or measured).

At stage 1020, the anomaly detection unit 650 determines whether an RF communication signal, e.g., the communication signal 800, transmitted by the interface 620 (e.g., the wireless transmitter 822 and the antenna 824) is received by the interface 620 (e.g., the antenna 826 and the wireless receiver 828) with desired quality (e.g., of sufficient quality to be interpreted, decoded, and/or measured). If the RF communication signal is received with desired quality, then the method 1000 proceeds to stage 1040. If the RF communication signal is not received with desired quality, then there is a discrepancy and the method 1000 proceeds to stage 1030. At stage 1030, the anomaly detection unit 650 may determine that a communication anomaly exists (perhaps based on a threshold number of discrepancy determinations of a particular type or a combination of discrepancy types). The anomaly detection unit 650 may determine an anomaly region that is affected by the anomaly. The method 1000 proceeds to stage 1035 for mitigation, as appropriate, by the anomaly mitigation unit 660, and possibly the anomaly mitigation unit 550. At stage 1035, if an anomaly was determined at stage 1030, then one or more mitigation actions as discussed above may be taken. The method 1000 then proceeds to the next stage, i.e., the stage following the stage from which the method 1000 proceeded to stage 1030 for determination of a communication anomaly.

At stage 1040, the anomaly detection unit 650 determines whether an RF communication channel is full. For example, the anomaly detection unit 650 may determine whether the CBR of a C-V2X channel exceeds a CBR threshold. If the channel is full, then the method 1000 proceeds to stage 1030 for determination of a communication anomaly, and otherwise proceeds to stage 1050.

At stage 1050, the anomaly detection unit 650 determines whether the RSU 600 receives RF communication of desired quality from a quantity of OBUs consistent with RF communication of desired quality received by another RSU. For example, the anomaly detection unit 650 determines whether the interface 620 receives quality RF communications from the same quantity of OBUs from which the other RSU received quality RF communications. If not, e.g., the RSU 600 received quality RF communication from more or fewer OBUs than the other RSU, then the method 1000 proceeds to stage 1030 for determination of a communication anomaly, and otherwise proceeds to stage 1060.

At stage 1060, the anomaly detection unit 650 determines whether the RSU 600 receives quality RF communication from an expected quantity of OBUs based on one or more sensor measurements. For example, based on one or more images, radar measurements, lidar measurements, and/or sonar measurements, the anomaly detection unit 650 may determine a quantity of devices from which to expect RF communications. If the received quality RF communication corresponds a quantity of OBUs consistent with the expected quantity, then the method 1000 proceeds to stage 1070, and otherwise proceeds to stage 1030.

At stage 1070, the anomaly detection unit 650 determines whether any other indication of a communication anomaly (e.g., RF jamming) is present. For example, techniques other than those discussed explicitly herein may be used to detect RF jamming. If RF jamming is detected, then the method 1000 proceeds to stage 1030 for determination of a communication anomaly, and otherwise proceeds to stage 1080.

At stage 1080, the anomaly detection unit 650 determines whether a reported location of an OBU is consistent with a perceived location of the OBU. If the reported and perceived locations are consistent, then the method 1000 returns to stage 1010. If the reported and perceived locations are not consistent, then an SPS discrepancy exists and the method 1000 proceeds to stage 1090 where the anomaly detection unit 650 may determine that an SPS anomaly exists (perhaps based on a threshold number of discrepancy determinations). The method 1000 proceeds to stage 1035 for appropriate mitigation, and then the method 1000 proceeds to stage 1010.

Figure 11:
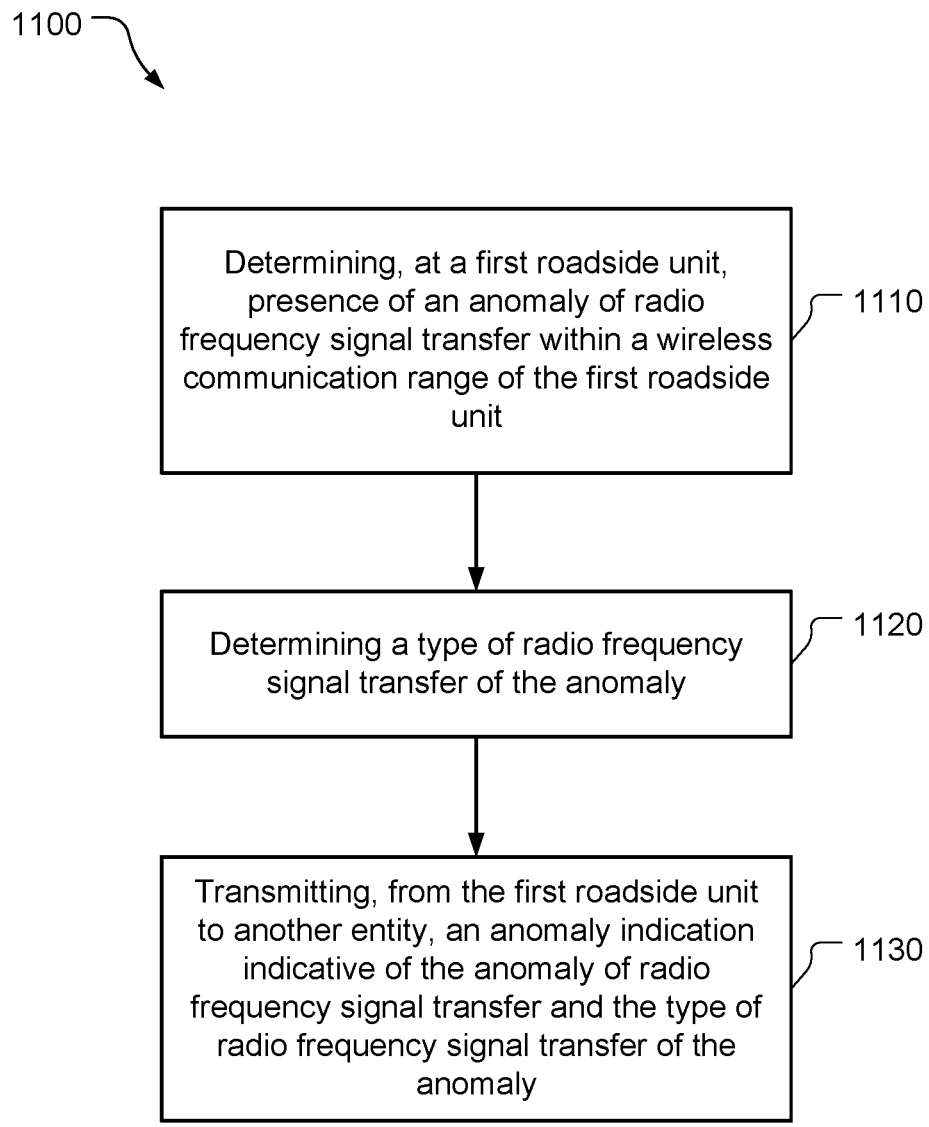
FIG. 11 is a block flow diagram of a radio frequency signal transfer anomaly notification method.

Referring to FIG. 11, with further reference to FIGS. 1-10, a radio frequency signal transfer anomaly notification method 1100 includes the stages shown. The method 1100 is, however, an example only and not limiting. The method 1100 may be altered, e.g., by having stages added, removed, rearranged, combined, performed concurrently, and/or having single stages split into multiple stages.

At stage 1110, the method 1100 includes determining, at a first roadside unit, presence of an anomaly of radio frequency signal transfer within a wireless communication range of the first roadside unit. For example, the anomaly detection unit 650 may determine that a communication anomaly and/or an SPS anomaly exists within communication range of the RSU 600. The processor 610, possibly in combination with the memory 630, possibly in combination with the interface 620, may comprise means for determining presence of an anomaly.

At stage 1120, the method 1100 includes determining a type of radio frequency signal transfer of the anomaly. For example, the anomaly detection unit 650 may determine that the anomaly is a communication anomaly corresponding to RF communication signal transfer (e.g., reception by a mobile device within the wireless communication range of the first roadside unit and/or by the first roadside unit) or an SPS anomaly corresponding to satellite vehicle signal transfer (e.g., reception by a mobile device within the wireless communication range of the first roadside unit). The processor 610, possibly in combination with the memory 630, possibly in combination with the interface 620, may comprise means for determining the type of RF signal transfer of the anomaly.

At stage 1130, the method 1100 includes transmitting, from the first roadside unit to another entity, an anomaly indication indicative of the anomaly of radio frequency signal transfer and the type of radio frequency signal transfer of the anomaly. For example, the anomaly mitigation unit 660 may transmit a notification of the anomaly and the type of the anomaly (e.g., communication anomaly or SPS anomaly). In this way, appropriate mitigation action(s) may be taken, e.g., avoidance of the anomaly, use of other technology for communication and/or for location determination and/or for ranging determination, etc. The processor 610, possibly in combination with the memory 630, in combination with the interface 620 may comprise means for transmitting the anomaly indication.

Implementations of the method 1100 may include one or more of the following features. In an example implementation, the method 1100 includes determining an anomaly region corresponding to the anomaly of radio frequency signal transfer, wherein the anomaly indication indicates the anomaly region. For example, the anomaly detection unit 650 may determine multiple occurrences of communication discrepancies or reported/perceived location discrepancies and locations of OBUs corresponding to the discrepancies to define a region affected by the anomaly. The anomaly mitigation unit 660 may include an indication (e.g., a definition of the boundary) of the anomaly region in the anomaly indication. In a further example implementation, the first roadside unit transmits the anomaly indication to a second roadside unit, or a traffic management center, or a mobile device, or any combination thereof. For example, the anomaly mitigation unit 660 of the RSU 910 may send an anomaly message to the RSU 920, to the TMC 950, and/or to one or more OBUs within the communication region 916. The RSU 920 may, for example, transmit a WSA message indicating an anomaly associated with the RSU 910 and the OBU 500 may monitor the WSA channel to determine anomalies and respond by taking appropriate mitigating action(s). The RSU 910 may transmit a warning using the WSA channel and the OBU 500, e.g., the anomaly mitigation unit 550, may take mitigating action(s) based on an inability to receive an RF health status via the WSA channel.

Also or alternatively, implementations of the method 1100 may include one or more of the following features. In an example implementation, determining the presence of the anomaly of radio frequency signal transfer includes: transmitting a radio frequency signal from a first antenna of the first roadside unit; listening for the radio frequency signal with a second antenna, separate from the first antenna, of the first roadside unit; and determining absence of adequate reception of the radio frequency signal by the second antenna. For example, as discussed with respect to FIG. 8, the RSU 600 may transmit the communication signals 800 and determine that a communication anomaly is present at the RSU 600 based on the antenna 826 and the wireless receiver 828 not receiving the communication signals 800 with sufficient quality to accurately interpret, decode, and/or measure the communication signals 800. The processor 610, possibly in combination with the memory 630, in combination with the wireless transmitter 822 and the antenna 824 may comprise means for transmitting the RF signal. The processor 610, possibly in combination with the memory 630, in combination with the wireless receiver 828 and the antenna 826 may comprise means for listening for the RF signal. The processor 610, possibly in combination with the memory 630, may comprise means for determining absence of adequate reception of the RF signal. In another example implementation, the method 1100 includes determining a quantity of mobile devices from which radio frequency communication is expected, wherein the first roadside unit determines the presence of the anomaly of radio frequency signal transfer based on the first roadside unit receiving radio frequency communication of acceptable quality, if at all, from fewer than the quantity of the mobile devices from which the radio frequency communication is expected. For example, the anomaly detection unit 650 may communicate with one or more other RSUs and/or may analyze one or more sensor measurements and/or may communicate with a server such as the TMC 950 to determine an expected quantity of OBUs from which to expect RF communication. The anomaly detection unit 650 may determine that a communication anomaly exists based on the RSU 600 receiving high-quality RF communication from fewer than the expected quantity of mobile devices. The processor 610, possibly in combination with the memory 630, possibly in combination with the interface 620 and/or one or more of the sensor(s) 750, may comprise means for determining the quantity of mobile devices from which radio frequency communication is expected. In a further example implementation, determining the quantity of mobile devices includes: receiving a communication, at the first roadside unit from a second roadside unit, indicating the quantity of mobile devices; or analyzing one or more sensor measurements; or a combination thereof. For example, as discussed above, if the RSU 920 indicates to the RSU 910 that the RSU 920 received high-quality communications from R OBUs and the RSU 910 receives high-quality communications from Q OBUs (where Q may be zero), then the anomaly detection unit 650 of the RSU 910 may determine that a communication anomaly exists near the RSU 910 if Q<R or possibly Q<R−D, where D is a non-zero integer. As another example, the anomaly detection unit 650 of the RSU 910 may determine that a communication anomaly exists near the RSU 920 if Q>R or possibly Q>R+E, where E is a non-zero integer. As another example, the anomaly detection unit 650 of the RSU 910 may analyze one or more sensor measurements to determine a quantity M of OBUs in the communication region 916, compare the quantity M with the quantity N of OBUs from which communications are received, and determine that a communication anomaly is present if N<M, or perhaps that N<M−P, where P is a non-zero integer. The processor 610, possibly in combination with the memory 630, in combination with the interface 620 (e.g., a wired receiver) may comprise means for receiving the communication from the second roadside unit. The processor 610, possibly in combination with the memory 630, possibly in combination with one or more of the sensor(s) 750, may comprise means for analyzing one or more sensor measurements.

Also or alternatively, implementations of the method 1100 may include one or more of the following features. In an example implementation, determining the presence of the anomaly of radio frequency signal transfer includes: determining a difference between a perceived location of a mobile device and a reported location of the mobile device received from the mobile device; and determining that the difference between the perceived location of the mobile device and the reported location of the mobile device is greater than a threshold. For example, the anomaly detection unit 650 may receive a communication from an OBU indicating a location of the OBU, and the anomaly detection unit 650 may independently determine the location of the OBU (e.g., a location of a device containing the OBU), e.g., using one or more sensor measurements, and determine that an SPS anomaly exists if the reported and perceived locations are more than a threshold distance from each other. The processor 610, possibly in combination with the memory 630, may comprise means for determining the difference between the perceived location and the reported location, and means for determining that the difference is greater than a threshold. In a further example implementation, the method 1100 includes determining the perceived location of the mobile device by analyzing a sensor measurement taken by the first roadside unit, or a signal measurement of a signal received by the first roadside unit from the mobile device, or a combination thereof. For example, the processor 710 may analyze one or more measurements taken by one or more of the sensor(s) 750 to determine location of an OBU and/or may analyze a measurement of signal (e.g., a communication signal) received from the OBU to determine the location of the OBU. The processor 710, possibly in combination with the memory 730, in combination with one or more of the sensor(s) 750 may comprise means for determining the perceive location of the mobile device.

Implementation Examples

Implementation examples are provided in the following numbered clauses.

Clause 1. A radio frequency signal transfer anomaly notification method comprising:
  determining, at a first roadside unit, presence of an anomaly of radio frequency signal transfer within a wireless communication range of the first roadside unit;
  determining a type of radio frequency signal transfer of the anomaly; and
  transmitting, from the first roadside unit to another entity, an anomaly indication indicative of the anomaly of radio frequency signal transfer and the type of radio frequency signal transfer of the anomaly.

Clause 2. The radio frequency signal transfer anomaly notification method of clause 1, further comprising determining an anomaly region corresponding to the anomaly of radio frequency signal transfer, wherein the anomaly indication indicates the anomaly region.

Clause 3. The radio frequency signal transfer anomaly notification method of clause 2, wherein the first roadside unit transmits the anomaly indication to a second roadside unit, or a traffic management center, or a mobile device, or any combination thereof.

Clause 4. The radio frequency signal transfer anomaly notification method of clause 1, wherein determining the presence of the anomaly of radio frequency signal transfer comprises:
  transmitting a radio frequency signal from a first antenna of the first roadside unit;
  listening for the radio frequency signal with a second antenna, separate from the first antenna, of the first roadside unit; and
  determining absence of adequate reception of the radio frequency signal by the second antenna.

Clause 5. The radio frequency signal transfer anomaly notification method of clause 1, further comprising determining a quantity of mobile devices from which radio frequency communication is expected, wherein the first roadside unit determines the presence of the anomaly of radio frequency signal transfer based on the first roadside unit receiving radio frequency communication of acceptable quality, if at all, from fewer than the quantity of the mobile devices from which the radio frequency communication is expected.

Clause 6. The radio frequency signal transfer anomaly notification method of clause 5, wherein determining the quantity of mobile devices comprises:
  receiving a communication, at the first roadside unit from a second roadside unit, indicating the quantity of mobile devices; or
  analyzing one or more sensor measurements; or
  a combination thereof.

Clause 7. The radio frequency signal transfer anomaly notification method of clause 1, wherein determining the presence of the anomaly of radio frequency signal transfer comprises:
  determining a difference between a perceived location of a mobile device and a reported location of the mobile device received from the mobile device; and
  determining that the difference between the perceived location of the mobile device and the reported location of the mobile device is greater than a threshold.

Clause 8. The radio frequency signal transfer anomaly notification method of clause 7, further comprising determining the perceived location of the mobile device by analyzing a sensor measurement taken by the first roadside unit, or a signal measurement of a signal received by the first roadside unit from the mobile device, or a combination thereof.

Clause 9. A first roadside unit comprising:
  a transceiver;
  a memory; and
  a processor communicatively coupled to the transceiver and the memory and configured to:
    determine presence of an anomaly of radio frequency signal transfer within a wireless communication range of the first roadside unit;
    determine a type of radio frequency signal transfer of the anomaly; and
    transmit, to another entity, an anomaly indication indicative of the anomaly of radio frequency signal transfer and the type of radio frequency signal transfer of the anomaly.

Clause 10. The first roadside unit of clause 9, wherein the processor is further configured to determine an anomaly region corresponding to the anomaly of radio frequency signal transfer, wherein the anomaly indication indicates the anomaly region.

Clause 11. The first roadside unit of clause 10, wherein the processor is configured to transmit the anomaly indication to a second roadside unit, or a traffic management center, or a mobile device, or any combination thereof.

Clause 12. The first roadside unit of clause 9, wherein to determine the presence of the anomaly of radio frequency signal transfer the processor is further configured to:
  transmit a radio frequency signal from a first antenna of the first roadside unit;
  listen for the radio frequency signal with a second antenna, separate from the first antenna, of the first roadside unit; and
  determine absence of adequate reception of the radio frequency signal by the second antenna.

Clause 13. The first roadside unit of clause 9, wherein the processor is further configured to:
  determine a quantity of mobile devices from which a respective radio frequency communication is expected; and
  determine the presence of the anomaly of radio frequency signal transfer based on receiving the respective radio frequency communication, if at all, from fewer than the quantity of the mobile devices from which the radio frequency communication is expected.

Clause 14. The first roadside unit of clause 13, wherein to determine the quantity of mobile devices the processor is further configured to:
- receive a communication, from a second roadside unit, indicating the quantity of mobile devices; or
- analyze one or more sensor measurements; or
- a combination thereof.

Clause 15. The first roadside unit of clause 9, wherein the processor is further configured to:
- determine a difference between a perceived location of a mobile device and a reported location of the mobile device received from the mobile device; and
- determine the presence of the anomaly of radio frequency signal transfer based on the difference between the perceived location of the mobile device and the reported location of the mobile device being greater than a threshold.

Clause 16. The first roadside unit of clause 15, wherein the processor is further configured to determine the perceived location of the mobile device, and wherein to determine the perceive location of the mobile device the processor is further configured to analyze a sensor measurement taken by the first roadside unit, or a signal measurement of a signal received by the first roadside unit from the mobile device, or a combination thereof.

Clause 17. A first roadside unit comprising:
- means for determining presence of an anomaly of radio frequency signal transfer within a wireless communication range of the first roadside unit;
- means for determining a type of radio frequency signal transfer of the anomaly; and
- means for transmitting an anomaly indication indicative of the anomaly of radio frequency signal transfer and the type of radio frequency signal transfer of the anomaly.

Clause 18. The first roadside unit of clause 17, further comprising means for determining an anomaly region corresponding to the anomaly of radio frequency signal transfer, wherein the anomaly indication indicates the anomaly region.

Clause 19. The first roadside unit of clause 18, wherein the means for transmitting the anomaly indication comprise means for transmitting the anomaly indication to a second roadside unit, or a traffic management center, or a mobile device, or any combination thereof.

Clause 20. The first roadside unit of clause 17, wherein the means for determining presence of the anomaly of radio frequency signal transfer comprise:
- means for transmitting a radio frequency signal;
- means for listening for the radio frequency signal; and
- means for determining presence of the anomaly of radio frequency signal transfer based on absence of adequate reception of the radio frequency signal by the means for listening for the radio frequency signal.

Clause 21. The first roadside unit of clause 17, further comprising means for determining a quantity of mobile devices from which radio frequency communication is expected, wherein the means for determining presence of the anomaly of radio frequency signal transfer comprise means for determining presence of the anomaly of radio frequency signal transfer based on the first roadside unit receiving radio frequency communication of acceptable quality, if at all, from fewer than the quantity of the mobile devices from which the radio frequency communication is expected.

Clause 22. The first roadside unit of clause 21, wherein means for determining the quantity of mobile devices comprise:
- means for receiving a communication from a second roadside unit indicating the quantity of mobile devices; or
- means for analyzing one or more sensor measurements; or
- a combination thereof.

Clause 23. The first roadside unit of clause 17, wherein the means for determining presence of the anomaly of radio frequency signal transfer comprise:
- means for determining a difference between a perceived location of a mobile device and a reported location of the mobile device received from the mobile device; and
- means for determining that the difference between the perceived location of the mobile device and the reported location of the mobile device is greater than a threshold.

Clause 24. A non-transitory, processor-readable storage medium comprising processor-readable instructions to cause a processor of a first roadside unit to:
- determine presence of an anomaly of radio frequency signal transfer within a wireless communication range of the first roadside unit;
- determine a type of radio frequency signal transfer of the anomaly; and
- transmit an anomaly indication indicative of the anomaly of radio frequency signal transfer and the type of radio frequency signal transfer of the anomaly.

Clause 25. The storage medium of clause 24, wherein the storage medium further comprises processor-readable instructions to cause the processor to determine an anomaly region corresponding to the anomaly of radio frequency signal transfer, wherein the anomaly indication indicates the anomaly region.

Clause 26. The storage medium of clause 25, wherein the processor-readable instructions to cause the processor to transmit the anomaly indication comprise processor-readable instructions to cause the processor to transmit the anomaly indication to a second roadside unit, or a traffic management center, or a mobile device, or any combination thereof.

Clause 27. The storage medium of clause 24, wherein the processor-readable instructions to cause the processor to determine the presence of the anomaly of radio frequency signal transfer comprise processor-readable instructions to cause the processor to:
- transmit a radio frequency signal;
- listen for the radio frequency signal; and
- determine the presence of the anomaly of radio frequency signal transfer based on absence of adequate reception of the radio frequency signal by the first roadside unit.

Clause 28. The storage medium of clause 24, further comprising processor-readable instructions to cause the processor to determine a quantity of mobile devices from which radio frequency communication is expected, wherein the processor-readable instructions to cause the processor to determine the presence of the anomaly of radio frequency signal transfer comprise processor-readable instructions to cause the processor to determine the presence of the anomaly of radio frequency signal transfer based on the first roadside unit receiving radio frequency communication of acceptable quality, if at all, from fewer than the quantity of the mobile devices from which the radio frequency communication is expected.

Clause 29. The storage medium of clause 28, wherein processor-readable instructions to cause the processor to determine the quantity of mobile devices comprise processor-readable instructions to cause the processor to:

receive a communication, from a second roadside unit, indicating the quantity of mobile devices; or analyze one or more sensor measurements; or a combination thereof.

Clause 30. The storage medium of clause 24, wherein the processor-readable instructions to cause the processor to determine the presence of the anomaly of radio frequency signal transfer comprise processor-readable instructions to cause the processor to:

determine a difference between a perceived location of a mobile device and a reported location of the mobile device received from the mobile device; and determine that the difference between the perceived location of the mobile device and the reported location of the mobile device is greater than a threshold.

OTHER CONSIDERATIONS

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion.

Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A radio frequency signal transfer anomaly notification method comprising:
   determining, at a first roadside unit, presence of an anomaly of wireless radio frequency signal transfer within a wireless communication range of the first roadside unit based on the first roadside unit receiving radio frequency communication of acceptable quality, if at all, from fewer than a quantity of mobile devices from which radio frequency communication is expected, wherein the wireless radio frequency signal transfer includes a communication signal reception, a satellite positioning system signal reception, or both;
   determining, at the first roadside unit, a type of wireless radio frequency signal transfer of the anomaly; and
   transmitting, from the first roadside unit to another entity, an anomaly indication indicative of the anomaly of wireless radio frequency signal transfer and the type of wireless radio frequency signal transfer of the anomaly.

2. The radio frequency signal transfer anomaly notification method of claim 1, further comprising determining an anomaly region corresponding to the anomaly of wireless radio frequency signal transfer, wherein the anomaly indication indicates the anomaly region.

3. The radio frequency signal transfer anomaly notification method of claim 2, wherein the first roadside unit transmits the anomaly indication to a second roadside unit, or a traffic management center, or a mobile device, or any combination thereof.

4. The radio frequency signal transfer anomaly notification method of claim 1, wherein determining the presence of the anomaly of wireless radio frequency signal transfer comprises:
   transmitting a radio frequency signal from a first antenna of the first roadside unit;
   listening for the radio frequency signal with a second antenna, separate from the first antenna, of the first roadside unit; and
   determining absence of adequate reception of the radio frequency signal by the second antenna.

5. The radio frequency signal transfer anomaly notification method of claim 1, further comprising determining the quantity of mobile devices from which radio frequency communication is expected based on one or more indications received by the first roadside unit, or one or more measurements by one or more sensors of the first roadside unit, or a combination thereof.

6. The radio frequency signal transfer anomaly notification method of claim 5, wherein determining the quantity of mobile devices comprises:
   receiving a communication, at the first roadside unit from a second roadside unit, indicating the quantity of mobile devices; or
   analyzing one or more sensor measurements; or
   a combination thereof.

7. The radio frequency signal transfer anomaly notification method of claim 1, wherein determining the presence of the anomaly of wireless radio frequency signal transfer comprises:
   determining a difference between a perceived location, based on one or more sensor measurements by the first roadside unit, of a mobile device and a reported location of the mobile device received from the mobile device; and
   determining that the difference between the perceived location of the mobile device and the reported location of the mobile device is greater than a threshold.

8. The radio frequency signal transfer anomaly notification method of claim 7, further comprising determining the perceived location of the mobile device by analyzing a sensor measurement taken by the first roadside unit, or by analyzing a signal measurement of a signal received by the first roadside unit from the mobile device, or a combination thereof.

9. The radio frequency signal transfer anomaly notification method of claim 1, further comprising determining that the anomaly is radio frequency jamming, or determining that the anomaly is satellite positioning system spoofing.

10. A first roadside unit comprising:
    a transceiver;
    at least one sensor;
    a memory; and
    a processor communicatively coupled to the transceiver and the memory and configured to:
       determine a first quantity of mobile devices from which radio frequency communication of acceptable quality is received;
       determine a presence of an anomaly of wireless radio frequency signal transfer within a wireless communication range of the first roadside unit based on the first quantity of mobile devices being less than a second quantity of mobile devices from which radio frequency communication of acceptable quality is expected, wherein the wireless radio frequency signal transfer includes a communication signal reception, a satellite positioning system signal reception, or both;
       determine a type of wireless radio frequency signal transfer of the anomaly; and
       transmit, to another entity, an anomaly indication indicative of the anomaly of wireless radio frequency signal transfer and the type of wireless radio frequency signal transfer of the anomaly.

11. The first roadside unit of claim 10, wherein the processor is further configured to determine an anomaly region corresponding to the anomaly of wireless radio frequency signal transfer, wherein the anomaly indication indicates the anomaly region.

12. The first roadside unit of claim 11, wherein the processor is configured to transmit the anomaly indication to a second roadside unit, or a traffic management center, or a mobile device, or any combination thereof.

13. The first roadside unit of claim 10, wherein to determine the presence of the anomaly of wireless radio frequency signal transfer the processor is further configured to:
 transmit a radio frequency signal from a first antenna of the first roadside unit;
 listen for the radio frequency signal with a second antenna, separate from the first antenna, of the first roadside unit; and
 determine absence of adequate reception of the radio frequency signal by the second antenna.

14. The first roadside unit of claim 10, wherein the processor is further configured to:
 determine the second quantity of mobile devices from which radio frequency communication of acceptable quality is expected based on one or more indications received by the first roadside unit, or one or more measurements by one or more sensors of the first roadside unit, or a combination thereof.

15. The first roadside unit of claim 14, wherein to determine the second quantity of mobile devices the processor is further configured to:
 receive a communication, from a second roadside unit, indicating the second quantity of mobile devices; or
 analyze one or more sensor measurements; or
 a combination thereof.

16. The first roadside unit of claim 10, wherein the processor is further configured to:
 determine a difference between a perceived location, based on one or more sensor measurements by the first roadside unit, of a mobile device and a reported location of the mobile device received from the mobile device; and
 determine the presence of the anomaly of wireless radio frequency signal transfer based on the difference between the perceived location of the mobile device and the reported location of the mobile device being greater than a threshold.

17. The first roadside unit of claim 16, wherein the processor is further configured to determine the perceived location of the mobile device, and wherein to determine the perceive location of the mobile device the processor is further configured to analyze a sensor measurement taken by the first roadside unit, or a signal measurement of a signal received by the first roadside unit from the mobile device, or a combination thereof.

18. A first roadside unit comprising:
 means for determining a first quantity of mobile devices from which radio frequency communication of acceptable quality is received;
 means for determining presence of an anomaly of wireless radio frequency signal transfer within a wireless communication range of the first roadside unit based on the first quantity of mobile devices being less than a second quantity of mobile devices from which radio frequency communication of acceptable quality is expected, wherein the wireless radio frequency signal transfer includes a communication signal reception, a satellite positioning system signal reception, or both;
 means for determining a type of wireless radio frequency signal transfer of the anomaly; and
 means for transmitting an anomaly indication indicative of the anomaly of wireless radio frequency signal transfer and the type of wireless radio frequency signal transfer of the anomaly.

19. The first roadside unit of claim 18, further comprising means for determining an anomaly region corresponding to the anomaly of wireless radio frequency signal transfer, wherein the anomaly indication indicates the anomaly region.

20. The first roadside unit of claim 19, wherein the means for transmitting the anomaly indication comprise means for transmitting the anomaly indication to a second roadside unit, or a traffic management center, or a mobile device, or any combination thereof.

21. The first roadside unit of claim 18, wherein the means for determining presence of the anomaly of wireless radio frequency signal transfer comprise:
 means for transmitting a radio frequency signal;
 means for listening for the radio frequency signal; and
 means for determining presence of the anomaly of wireless radio frequency signal transfer based on absence of adequate reception of the radio frequency signal by the means for listening for the radio frequency signal.

22. The first roadside unit of claim 18, further comprising means for determining the second quantity of mobile devices from which radio frequency communication of acceptable quality is expected based on one or more indications received by the first roadside unit, or one or more measurements by one or more sensors of the first roadside unit, or a combination thereof.

23. The first roadside unit of claim 22, wherein means for determining the second quantity of mobile devices comprise:
 means for receiving a communication from a second roadside unit indicating the second quantity of mobile devices; or
 means for analyzing one or more sensor measurements; or
 a combination thereof.

24. The first roadside unit of claim 18, wherein the means for determining presence of the anomaly of wireless radio frequency signal transfer comprise:
 means for determining a difference between a perceived location, based on one or more sensor measurements by the first roadside unit, of a mobile device and a reported location of the mobile device received from the mobile device; and
 means for determining that the difference between the perceived location of the mobile device and the reported location of the mobile device is greater than a threshold.

25. A non-transitory, processor-readable storage medium comprising processor-readable instructions to cause a processor of a first roadside unit, when executed by the processor, to:
 determine a first quantity of mobile devices from which radio frequency communication of acceptable quality is received;
 determine a presence of an anomaly of wireless radio frequency signal transfer within a wireless communication range of the first roadside unit based on the first quantity of mobile devices being less than a second quantity of mobile devices from which radio frequency communication of acceptable quality is expected, wherein the wireless radio frequency signal transfer includes a communication signal reception, a satellite positioning system signal reception, or both;

determine a type of wireless radio frequency signal transfer of the anomaly; and transmit an anomaly indication indicative of the anomaly of wireless radio frequency signal transfer and the type of wireless radio frequency signal transfer of the anomaly.

26. The storage medium of claim 25, wherein the storage medium further comprises processor-readable instructions to cause the processor, when executed by the processor, to determine an anomaly region corresponding to the anomaly of wireless radio frequency signal transfer, wherein the anomaly indication indicates the anomaly region.

27. The storage medium of claim 26, wherein the processor-readable instructions to cause the processor to transmit the anomaly indication comprise processor-readable instructions to cause the processor, when executed by the processor, to transmit the anomaly indication to a second roadside unit, or a traffic management center, or a mobile device, or any combination thereof.

28. The storage medium of claim 25, wherein the processor-readable instructions to cause the processor to determine the presence of the anomaly of wireless radio frequency signal transfer comprise processor-readable instructions to cause the processor, when executed by the processor, to:

transmit a radio frequency signal;

listen for the radio frequency signal; and determine the presence of the anomaly of wireless radio frequency signal transfer based on absence of adequate reception of the radio frequency signal by the first roadside unit.

29. The storage medium of claim 25, further comprising processor-readable instructions to cause the processor, when executed by the processor, to determine the second quantity of mobile devices from which radio frequency communication of acceptable quality is expected based on one or more indications received by the first roadside unit, or one or more measurements by one or more sensors of the first roadside unit, or a combination thereof.

30. The storage medium of claim 29, wherein processor-readable instructions to cause the processor to determine the second quantity of mobile devices comprise processor-readable instructions to cause the processor, when executed by the processor, to: receive a communication, from a second roadside unit, indicating the second quantity of mobile devices; or analyze one or more sensor measurements; or a combination thereof.

31. The storage medium of claim 25, wherein the processor-readable instructions to cause the processor to determine the presence of the anomaly of wireless radio frequency signal transfer comprise processor-readable instructions to cause the processor, when executed by the processor, to:

determine a difference between a perceived location, based on one or more sensor measurements by the first roadside unit, of a mobile device and a reported location of the mobile device received from the mobile device; and determine that the difference between the perceived location of the mobile device and the reported location of the mobile device is greater than a threshold.

* * * * *